United States Patent
Dobyns et al.

(10) Patent No.: US 10,164,685 B2
(45) Date of Patent: Dec. 25, 2018

(54) SPATIALLY AWARE WIRELESS NETWORK

(71) Applicant: FREELINC TECHNOLOGIES INC., Orem, UT (US)

(72) Inventors: Douglas Howard Dobyns, Lindon, UT (US); Michael Scott Abrams, Sherborn, MA (US)

(73) Assignee: FREELINC TECHNOLOGIES INC., Orem, UT (US)

( * ) Notice: Subject to any disclaimer, the term of this patent is extended or adjusted under 35 U.S.C. 154(b) by 0 days.

(21) Appl. No.: 14/985,147

(22) Filed: Dec. 30, 2015

(65) Prior Publication Data
US 2016/0191120 A1  Jun. 30, 2016

Related U.S. Application Data

(60) Provisional application No. 62/099,055, filed on Dec. 31, 2014.

(51) Int. Cl.
*H04B 5/00* (2006.01)
*H04W 4/80* (2018.01)

(52) U.S. Cl.
CPC ......... *H04B 5/0031* (2013.01); *H04B 5/0075* (2013.01); *H04W 4/80* (2018.02)

(58) Field of Classification Search
CPC .... H04B 5/0031; H04B 5/0075; H04W 4/008
See application file for complete search history.

(56) References Cited

U.S. PATENT DOCUMENTS

| | | | |
|---|---|---|---|
| 3,660,760 A | 5/1972 | Schaad et al. |
| 4,363,137 A | 12/1982 | Salisbury |
| 4,908,869 A | 3/1990 | Lederman |
| 5,187,720 A | 2/1993 | Shibata et al. |
| 5,771,438 A | 6/1998 | Palermo et al. |
| 5,841,122 A | 11/1998 | Kirchhoff |
| 5,912,925 A | 6/1999 | Palermo et al. |
| 5,966,641 A | 10/1999 | Flowerdew |
| 5,982,764 A | 11/1999 | Palermo et al. |
| 6,061,030 A | 5/2000 | Flowerdew |
| 6,134,420 A | 10/2000 | Flowerdew et al. |

(Continued)

FOREIGN PATENT DOCUMENTS

| | | |
|---|---|---|
| GB | 244965 | 8/2006 |
| WO | WO 2007/039835 | 4/2007 |

(Continued)

OTHER PUBLICATIONS

US 8,200,153, 06/2012, Takayama et al. (withdrawn)

(Continued)

*Primary Examiner* — Md Talukder
(74) *Attorney, Agent, or Firm* — Thorpe North & Western

(57) ABSTRACT

Technology for a spatially aware wireless network is disclosed. One embodiment comprises a plurality of near field magnetic induction nodes. One or more nodes is configured to communicate a polarized spatial position signal using near field magnetic induction (NFMI) to determine one or more of a position and an orientation of one or more nodes in the spatially aware wireless network. A detection module is operable to configure the spatially aware wireless network based one or more of a position and an orientation of one or more nodes in the plurality of nodes.

29 Claims, 11 Drawing Sheets

(56) References Cited

U.S. PATENT DOCUMENTS

| | | |
|---|---|---|
| 6,208,740 B1 | 3/2001 | Grever |
| 6,230,029 B1 | 5/2001 | Hahn et al. |
| 6,347,095 B1 | 2/2002 | Tang et al. |
| 6,384,587 B2 | 5/2002 | Aizawa et al. |
| 6,459,882 B1 | 10/2002 | Palermo et al. |
| 6,636,728 B1 | 10/2003 | Avenel |
| 6,665,804 B1 | 12/2003 | Minowa |
| 6,700,544 B2 | 3/2004 | Anderson |
| 6,792,246 B2 | 9/2004 | Takeda et al. |
| 6,819,762 B2 | 11/2004 | Jones et al. |
| 6,840,448 B2 | 1/2005 | Fukushima et al. |
| 6,869,019 B1 | 3/2005 | Nagi et al. |
| 7,035,608 B2 | 4/2006 | Palermo et al. |
| 7,096,069 B2 | 8/2006 | Wanderstok et al. |
| 7,142,811 B2 | 11/2006 | Terranova et al. |
| 7,149,522 B2 | 12/2006 | Koskelainen |
| 7,182,266 B2 | 2/2007 | Yoshinaga et al. |
| 7,198,198 B2 | 4/2007 | Akiho et al. |
| 7,215,924 B2 | 5/2007 | Palermo et al. |
| 7,236,741 B2 | 6/2007 | Palermo et al. |
| 7,254,366 B2 | 8/2007 | Palermo et al. |
| 7,262,737 B2 | 8/2007 | Zarnowitz et al. |
| RE39,982 E | 1/2008 | Palermo et al. |
| RE40,018 E | 1/2008 | Palermo et al. |
| 7,315,290 B2 | 1/2008 | Harada et al. |
| 7,342,548 B2 | 3/2008 | Taniguchi et al. |
| 7,346,061 B2 | 3/2008 | Takayama et al. |
| 7,364,144 B2 | 4/2008 | Nordmeyer |
| 7,438,235 B2 | 10/2008 | Miura et al. |
| 7,457,637 B2 | 11/2008 | Deguchi et al. |
| 7,532,901 B1 | 5/2009 | LaFranchise et al. |
| 7,541,930 B2 | 6/2009 | Saarisalo et al. |
| 7,565,187 B1 | 7/2009 | Dynok et al. |
| 7,574,173 B2 | 8/2009 | Terranova et al. |
| 7,627,289 B2 | 12/2009 | Huddart |
| 7,647,024 B2 | 1/2010 | Wang et al. |
| 7,712,663 B2 | 5/2010 | Sukegawa et al. |
| 7,818,036 B2 | 10/2010 | Lair et al. |
| 7,818,037 B2 | 10/2010 | Lair et al. |
| 7,831,205 B2 | 11/2010 | Jack et al. |
| 7,872,995 B2 | 1/2011 | Fujii |
| 7,893,888 B2 | 2/2011 | Rofougaran |
| 7,903,041 B2 | 3/2011 | LeVan |
| 7,933,554 B2 | 4/2011 | Hoyt et al. |
| 7,941,096 B2 | 5/2011 | Perkins et al. |
| 8,106,848 B2 | 1/2012 | Rofougaran |
| 8,144,792 B2 | 3/2012 | Ware et al. |
| 8,145,744 B2 | 3/2012 | Gielis |
| 8,190,086 B2 | 5/2012 | Sasaki et al. |
| 8,194,557 B2 | 6/2012 | Sasai et al. |
| 8,224,243 B2 | 7/2012 | Takayama et al. |
| 8,233,841 B2 | 7/2012 | Griffin et al. |
| 8,237,569 B2 | 8/2012 | Arai et al. |
| 8,239,276 B2 | 8/2012 | Lin et al. |
| 8,275,318 B2 | 9/2012 | Hoyt et al. |
| 8,322,615 B2 | 12/2012 | Ikeda |
| 8,335,470 B2 | 12/2012 | Koyama |
| 8,340,577 B2 | 12/2012 | Griffin et al. |
| 8,358,596 B2 | 1/2013 | Byrne et al. |
| 8,380,124 B2 | 2/2013 | Takei et al. |
| 8,385,823 B2 | 2/2013 | Naniyat |
| 8,401,596 B2 | 3/2013 | Takayama |
| 8,410,775 B2 | 4/2013 | LaFranchise et al. |
| 8,416,078 B2 | 4/2013 | Sayegh et al. |
| 8,417,184 B2 | 4/2013 | Takayama et al. |
| 8,422,947 B2 | 4/2013 | Konya |
| 8,427,100 B2 | 4/2013 | Vorenkamp et al. |
| 8,427,330 B2 | 4/2013 | Vorenkamp et al. |
| 8,437,694 B2 | 5/2013 | Granqvist et al. |
| 8,452,233 B2 | 5/2013 | Noel |
| 8,457,547 B2 | 6/2013 | Meskens |
| 8,457,550 B2 | 6/2013 | Goto et al. |
| 8,466,740 B2 | 6/2013 | Kamata |
| 8,494,198 B2 | 7/2013 | Aldaz et al. |
| 8,532,568 B2 | 9/2013 | Kerselaers |
| 8,532,570 B2 | 9/2013 | Fukami et al. |
| 8,536,736 B2 | 9/2013 | Abramo et al. |
| 8,583,040 B2 | 11/2013 | Baumert et al. |
| 8,588,683 B2 | 11/2013 | Kamata |
| 8,630,584 B2 | 1/2014 | Yu et al. |
| 8,643,219 B2 | 2/2014 | Yabe et al. |
| 8,660,604 B2 | 2/2014 | Rofougaran |
| 8,665,840 B2 | 3/2014 | Hohl et al. |
| 8,706,029 B2 | 4/2014 | Washiro |
| 8,732,319 B2 | 5/2014 | Tian |
| 8,838,022 B2 | 9/2014 | Dobyns |
| 8,880,100 B2 | 11/2014 | Dobyns |
| 8,902,772 B2 | 12/2014 | Lenaerts |
| 8,903,416 B1 | 12/2014 | Perkins et al. |
| 8,909,141 B2 | 12/2014 | Hansen et al. |
| 8,923,765 B2 | 12/2014 | Behzad et al. |
| 8,929,809 B2 | 1/2015 | Dobyns |
| 8,942,629 B2 | 1/2015 | Takayama et al. |
| 8,948,694 B2 | 2/2015 | Ebeid et al. |
| 8,954,005 B2 | 2/2015 | Zhao et al. |
| 8,977,200 B2 | 3/2015 | Kitagawa et al. |
| 8,983,529 B2 | 3/2015 | Akiyama et al. |
| 8,983,615 B2 | 3/2015 | Tahmasian et al. |
| 8,989,657 B2 | 3/2015 | McManus et al. |
| 8,989,659 B2 | 3/2015 | Akita et al. |
| 9,013,303 B2 | 4/2015 | Arai et al. |
| 9,048,884 B2 | 6/2015 | LeVan |
| 9,054,746 B2 | 6/2015 | Miyabayashi et al. |
| 9,058,531 B2 | 6/2015 | Slutsky |
| 9,071,288 B2 | 6/2015 | Yamaguchi |
| 9,077,390 B1 | 7/2015 | Joehren |
| 9,082,117 B2 | 7/2015 | Chin |
| 9,106,273 B2 | 8/2015 | Takayama et al. |
| 9,124,306 B2 | 9/2015 | Boyle et al. |
| 9,124,992 B2 | 9/2015 | Jang |
| 9,166,286 B2 | 10/2015 | Matsuoka et al. |
| 9,166,655 B2 | 10/2015 | Meskens et al. |
| 9,197,986 B1 | 11/2015 | Kerselaers et al. |
| 9,219,529 B2 | 12/2015 | Akiyama et al. |
| 9,229,666 B2 | 1/2016 | Oguma et al. |
| 9,281,872 B2 | 3/2016 | Gree et al. |
| 2001/0006536 A1 | 7/2001 | Tjima |
| 2002/0132585 A1 | 9/2002 | Palermo et al. |
| 2002/0160722 A1 | 10/2002 | Terranova et al. |
| 2002/0174025 A1 | 11/2002 | Hind et al. |
| 2003/0017826 A1 | 1/2003 | Fishman et al. |
| 2003/0050011 A1 | 3/2003 | Palermo et al. |
| 2003/0161410 A1 | 8/2003 | Smith et al. |
| 2004/0032363 A1* | 2/2004 | Schantz ............ G01S 5/14 342/127 |
| 2004/0203423 A1* | 10/2004 | Kurhila ............ H04W 24/00 455/67.11 |
| 2004/0227682 A1* | 11/2004 | Anderson ............ G06K 7/0008 343/742 |
| 2005/0046608 A1* | 3/2005 | Schantz ............ G01S 5/14 342/127 |
| 2005/0064915 A1 | 3/2005 | Lair |
| 2005/0138077 A1 | 6/2005 | Michael et al. |
| 2005/0164636 A1 | 7/2005 | Palermo et al. |
| 2006/0023679 A1* | 2/2006 | Twitchell, Jr. ......... H04Q 9/00 370/338 |
| 2006/0073825 A1 | 4/2006 | Palermo et al. |
| 2006/0100926 A1 | 5/2006 | Abedi et al. |
| 2006/0119534 A1 | 6/2006 | Semba et al. |
| 2006/0132352 A1* | 6/2006 | Schantz ............ G01C 21/206 342/125 |
| 2006/0224048 A1 | 10/2006 | Devaul et al. |
| 2007/0054616 A1 | 3/2007 | Culbert |
| 2007/0082677 A1* | 4/2007 | Donald Hart ......... H04W 16/18 455/456.1 |
| 2007/0278290 A1 | 12/2007 | Messerges et al. |
| 2007/0297378 A1 | 12/2007 | Poyhonen et al. |
| 2008/0090520 A1 | 4/2008 | Camp et al. |
| 2008/0091541 A1 | 4/2008 | Law et al. |
| 2008/0278289 A1 | 11/2008 | Gantner |
| 2009/0001930 A1 | 1/2009 | Pohjonen |
| 2009/0027166 A1 | 1/2009 | Stevens et al. |
| 2009/0029743 A9 | 1/2009 | Lair et al. |
| 2009/0296770 A1 | 1/2009 | Stevens et al. |

(56) References Cited

U.S. PATENT DOCUMENTS

| | | |
|---|---|---|
| 2009/0038013 A1 | 2/2009 | Zechlin et al. |
| 2009/0041241 A1 | 2/2009 | Dobyns et al. |
| 2009/0081943 A1 | 3/2009 | Dobyns et al. |
| 2009/0146796 A1 | 6/2009 | Goto et al. |
| 2009/0167699 A1 | 7/2009 | Rosenblatt et al. |
| 2009/0189816 A1 | 7/2009 | Nikitin et al. |
| 2009/0212941 A1 | 8/2009 | Vock et al. |
| 2009/0276439 A1 | 11/2009 | Rosenblatt et al. |
| 2009/0276547 A1 | 11/2009 | Rosenblatt et al. |
| 2010/0026589 A1 | 2/2010 | Dou et al. |
| 2010/0080165 A1 | 4/2010 | Hossain et al. |
| 2010/0104031 A1 | 4/2010 | Lacour |
| 2011/0018768 A1* | 1/2011 | Thoen .................. H04B 5/00 342/448 |
| 2011/0183617 A1 | 7/2011 | Behzad et al. |
| 2011/0201270 A1 | 8/2011 | Perkins et al. |
| 2011/0220527 A1 | 9/2011 | Baatz |
| 2011/0307380 A1 | 12/2011 | Ido |
| 2012/0083228 A1 | 4/2012 | Baumert et al. |
| 2012/0116861 A1 | 5/2012 | Dobyns |
| 2012/0173351 A1 | 7/2012 | Hanson et al. |
| 2012/0202185 A1 | 8/2012 | Jabara et al. |
| 2012/0203620 A1 | 8/2012 | Jensen |
| 2012/0220227 A1 | 8/2012 | Jensen |
| 2012/0238209 A1 | 9/2012 | Walker et al. |
| 2012/0281843 A1 | 11/2012 | Christensen et al. |
| 2012/0289153 A1 | 11/2012 | Dobyns |
| 2012/0296770 A1 | 11/2012 | Lin et al. |
| 2012/0317194 A1 | 12/2012 | Tian |
| 2013/0020394 A1 | 1/2013 | Koujima et al. |
| 2013/0064235 A1* | 3/2013 | Burra .................. H04W 28/06 370/338 |
| 2013/0072115 A1* | 3/2013 | Dobyns .............. H04B 5/0081 455/41.1 |
| 2013/0079037 A1 | 3/2013 | Dobyns |
| 2013/0114306 A1 | 5/2013 | Kooken et al. |
| 2013/0217334 A1 | 8/2013 | Yu et al. |
| 2013/0237190 A1 | 9/2013 | Smith et al. |
| 2013/0269945 A1 | 10/2013 | Mulholland et al. |
| 2013/0314334 A1 | 11/2013 | Leica et al. |
| 2013/0342326 A1 | 12/2013 | Wang et al. |
| 2013/0343585 A1 | 12/2013 | Bennett et al. |
| 2014/0011446 A1 | 1/2014 | Kangas et al. |
| 2014/0015649 A1 | 1/2014 | Akiyama et al. |
| 2014/0025517 A1 | 1/2014 | Argue et al. |
| 2014/0073237 A1 | 3/2014 | Meskens |
| 2014/0073300 A1 | 3/2014 | Leeder et al. |
| 2014/0077937 A1 | 3/2014 | Kato et al. |
| 2014/0091758 A1 | 4/2014 | Hidaka et al. |
| 2014/0096215 A1 | 4/2014 | Hessler |
| 2014/0133584 A1 | 5/2014 | Su et al. |
| 2014/0138435 A1 | 5/2014 | Khalid |
| 2014/0141750 A1 | 5/2014 | Lazaridis et al. |
| 2014/0153768 A1 | 6/2014 | Hagen et al. |
| 2014/0154980 A1 | 6/2014 | Jang et al. |
| 2014/0162550 A1 | 6/2014 | Boyle et al. |
| 2014/0173690 A1 | 6/2014 | Ekberg et al. |
| 2014/0181955 A1 | 6/2014 | Rosati |
| 2014/0191968 A1 | 7/2014 | Hohl et al. |
| 2014/0200022 A1* | 7/2014 | Sivanesan .......... H04W 64/006 455/456.1 |
| 2014/0213184 A1 | 7/2014 | Matsubara |
| 2014/0220885 A1 | 8/2014 | Chou et al. |
| 2014/0227974 A1 | 8/2014 | Perkins et al. |
| 2014/0256251 A1 | 9/2014 | Caceres et al. |
| 2014/0263619 A1 | 9/2014 | Turocy et al. |
| 2014/0308896 A1 | 10/2014 | Baret et al. |
| 2014/0315485 A1 | 10/2014 | Marie |
| 2014/0330575 A1 | 11/2014 | Traughber et al. |
| 2014/0348365 A1 | 11/2014 | Edwards |
| 2014/0376051 A1 | 12/2014 | Oguma et al. |
| 2015/0003551 A1 | 1/2015 | Kim |
| 2015/0044968 A1 | 2/2015 | Dobyns |
| 2015/0045069 A1 | 2/2015 | Dobyns |
| 2015/0050883 A1 | 2/2015 | Dobyns |
| 2015/0054455 A1 | 2/2015 | Kim et al. |
| 2015/0058191 A1 | 2/2015 | Khan et al. |
| 2015/0079902 A1 | 3/2015 | Dhayni |
| 2015/0093988 A1 | 4/2015 | Konanur et al. |
| 2015/0116090 A1 | 4/2015 | Proehl |
| 2015/0127737 A1 | 5/2015 | Thompson et al. |
| 2015/0134510 A1 | 5/2015 | O'Donoghue |
| 2015/0134610 A1 | 5/2015 | Barton |
| 2015/0140927 A1 | 5/2015 | Chen et al. |
| 2015/0171519 A1 | 6/2015 | Han et al. |
| 2015/0180270 A1 | 6/2015 | Takano |
| 2015/0180542 A1 | 6/2015 | Jang et al. |
| 2015/0195100 A1 | 7/2015 | Imes et al. |
| 2015/0229361 A1 | 8/2015 | Liu et al. |
| 2015/0244422 A1 | 8/2015 | Ohashi et al. |
| 2015/0254481 A1 | 9/2015 | Masuda et al. |
| 2015/0256230 A1 | 9/2015 | Yamaguchi |
| 2015/0256231 A1 | 9/2015 | Akiyama et al. |
| 2015/0300923 A1 | 10/2015 | Halbert |
| 2015/0312744 A1 | 10/2015 | Leppanen et al. |
| 2015/0318896 A1 | 11/2015 | Kerselaers et al. |
| 2015/0318932 A1 | 11/2015 | Kerselaers et al. |
| 2015/0319566 A1 | 11/2015 | Takayama et al. |
| 2015/0319634 A1* | 11/2015 | Zwirn .................. G01S 11/02 370/252 |
| 2015/0327003 A1 | 11/2015 | Dobyns |
| 2015/0365779 A1 | 12/2015 | Kerselaers et al. |
| 2015/0371226 A1 | 12/2015 | Hurley et al. |
| 2015/0381238 A1 | 12/2015 | Wolf et al. |
| 2015/0382150 A1 | 12/2015 | Ansermet et al. |
| 2015/0382196 A1* | 12/2015 | Hillier ................ H04W 12/08 726/7 |
| 2016/0005248 A1 | 1/2016 | Aase |
| 2016/0014582 A1 | 1/2016 | Dobyns |
| 2016/0029955 A1 | 2/2016 | Sato |
| 2016/0066141 A1* | 3/2016 | Jain .................... H04W 4/021 455/456.1 |
| 2016/0066143 A1 | 3/2016 | Dobyns et al. |
| 2016/0066185 A1 | 3/2016 | Dobyns et al. |
| 2016/0191120 A1* | 6/2016 | Dobyns .............. H04B 5/0031 455/41.1 |

FOREIGN PATENT DOCUMENTS

| | | |
|---|---|---|
| WO | WO 2008/048376 | 4/2008 |
| WO | WO 2014/046646 | 3/2014 |

OTHER PUBLICATIONS

Agbinya et al.: Size and Characteristics of the 'Cone of Silence' in Near Field Magnetic Induction Communications, MILCIS2009, Canberra; Nov. 2009; 4 Pages.

Finkenzeller; RFID Handbook: Fundamentals and Application in Contactless Smart Cards and Identification; Chapter Three: Fundamental Operating Principles; Aug. 2010; pp. 29-59.

http://www.nfe-forum.org/home/: as accessed Sep. 17, 2010; 5 pages.

Identification Cards—Contactless Integrated Circuit (s) Cards-Proximity Car—Part 1: Physical Characteristics; ISO/IE JTC1/SC17/WG802/14/2007; 8 pages.

Near Field Communication Interface and Protocol (NFCIP-1); Standard ECMA-340; $2^{nd}$ Edition; Dec. 2004; 65 pages.

Radio-Frequency-Identification; http://rfid-handbook.com/; 4 pages.

Sandrock et al; Wireless Transmission of Speech and Data to, Form, and Between Hearing Aids; The Hearing Journal; Nov. 2007; pp. 12-16, vol. 60, No. 11.

* cited by examiner

SPATIALLY AWARE WIRELESS NETWORK

RELATED APPLICATIONS

This application claims the benefit of and hereby incorporates by reference U.S. Provisional Patent Application Ser. No. 62/099,055 filed Dec. 31, 2014.

BACKGROUND

Wireless communication has revolutionized society in the 21$^{st}$ century. The way in which people talk, correspond, work, shop, and are entertained has all been changed due to the near omnipresent ability to wirelessly communicate. However, the transformation has typically been limited to the ability to send information and identify a person's location. As wireless networks develop, more and more devices and connected "things" will be configured to communicate over the internet. This is commonly referred to as the Internet of Things (IoT). As the density of connected devices, or nodes, increases, networks may be configured differently than typical networks operating today. Nodes in a network are typically not aware of the two dimensional or three dimensional spatial orientation of other nodes in a network. The ability to determine a fixed or relative spatial location of other nodes in a network can significantly enhance the capability and intelligence of a wireless network.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1A:
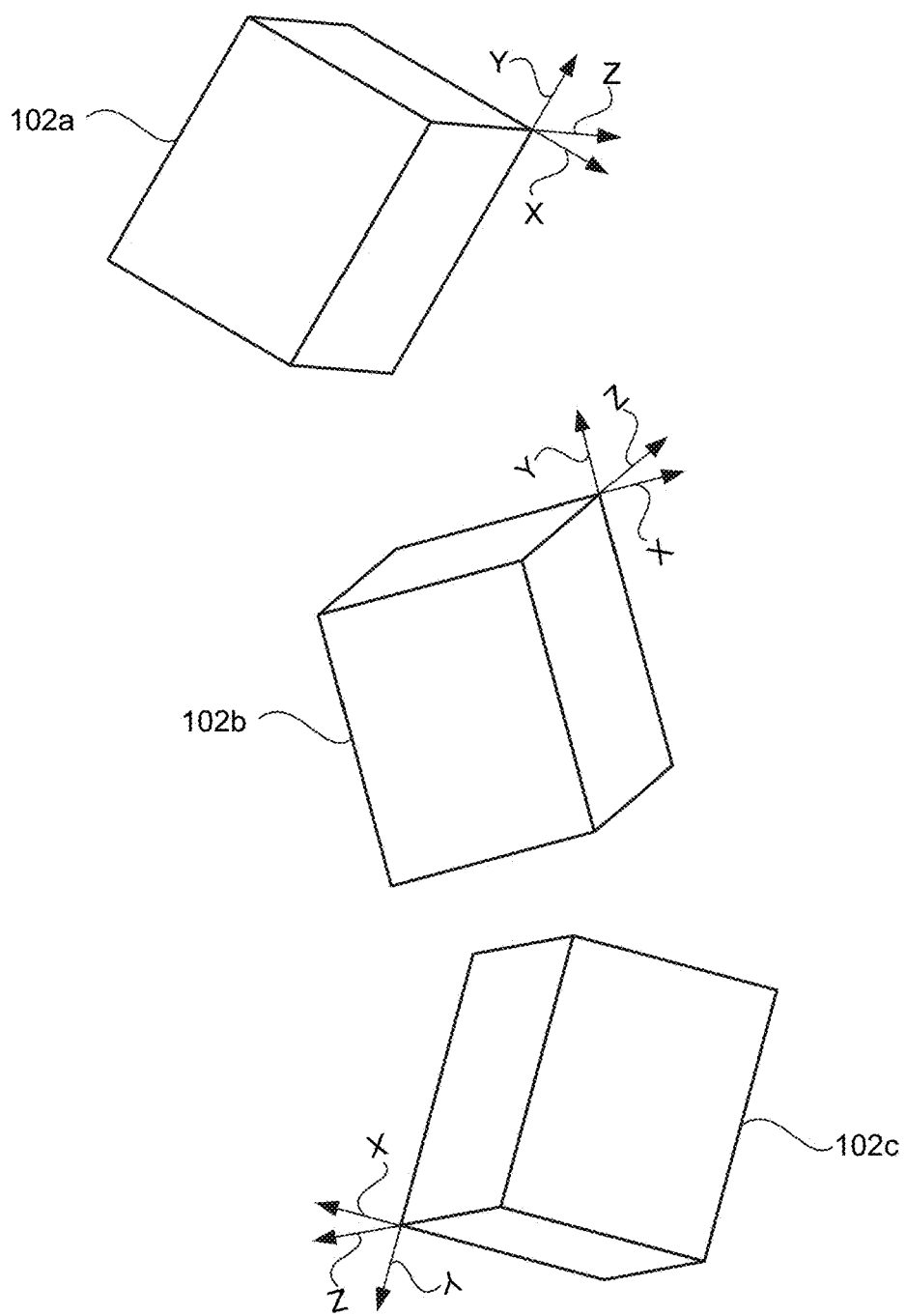
FIG. 1a is an example illustration of a spatially aware wireless network in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting. The following definitions are provided for clarity of the overview and embodiments described below.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "about" is used to provide flexibility to a numerical range endpoint by providing that a given value may be "a little above" or "a little below" the endpoint.

As used herein, the term "spatially aware node" refers to a transceiver configured to receive a polarized magnetic induction signal from a second node and determine an orientation and a position of the second node relative to the spatially aware node. Either the spatially aware node, the second node, or both the spatially aware node and the second node include two or more substantially orthogonal antennas to transmit and/or receive the polarized magnetic induction signal.

As used herein, the term "physical layer", when referencing an NFMI radio access technology (RAT), refers to the lowest layer, or layer one of the Open Systems Interconnect (OSI) model, on which the physical signals are transmitted between nodes.

As used herein, the term "data link layer", when referencing an NFMI RAT, refers to a second layer (L2) of the OSI model. The data link layer provides a node-to-node data transfer—a link between two directly connected nodes.

As used herein, the term "collect data" refers to reading, obtaining, or receiving information at one or more nodes, devices, or servers within the spatially aware network from a source (i.e. node, device, or server) located outside of the spatially aware network.

As used herein, discussion of a communication from one device to another device may be provided as an example communication between devices but is not intended to be limited to a unidirectional communication. For example, embodiments where a first device sends a communication to a second device are not-limited to a one-directional communication from the first to the second device, but can also include embodiments where the communication is sent from the second device to the first device, or where communications are bi-directionally exchanged from the first device to the second device and from the second device to the first device.

As used herein, the term "magnetic induction diversity" refers to the use of multiple orthogonal antennas to transmit or receive a magnetic induction signal within a controlled communication boundary. The multiple antennas may transmit or receive a magnetic induction signal simultaneously, independently from one another, or during a specified time slot.

As used herein, the term "spatial diversity", refers to the use of multiple orthogonal antennas to transmit or receive a polarized near field magnetic induction signal, wherein the multiple orthogonal antennas are configured and/or the magnetic induction signal is configured to allow a received polarized NFMI signal to be analyzed at a receiver node to determine an amplitude and a relative angular displacement between a transmitter node and the receiver node(s) in a spatially aware wireless network.

As used herein, the term "location" refers to an absolute physical location of a selected node in space, independent of the node's network. The absolute location may be referenced using a predetermined coordinate system, such as a Cartesian coordinate system, a polar coordinate system, or another desired coordinate system.

As used herein, the term "position" refers to a relative distance of a selected node relative to one or more nodes.

As used herein, the term "network position" refers to a position of a node in a network.

As used herein, the term "orientation" refers to an orientation of a first node relative to an orientation of one or more nodes. The relative orientation may be measured using a coordinate system, such as a Cartesian coordinate system, a polar coordinate system, another desired coordinate system, an angular position, an attitude, an orientation vector, Euler Angles, Tait-Bryan Angles, Miller Indices, an Orientation matrix, using yaw, pitch, and roll, or another desired measurement system.

As used herein, "spatial awareness" refers to a node that is configured to determine a spatial arrangement of one or more nodes in a wireless network using a polarized NFMI signal to determine a relative orientation and a relative position.

As used herein, a spatially aware wireless network is a wireless network containing spatially aware wireless nodes with one or more Radio Access Technologies (RATs), wherein one of the RATs is a near field magnetic induction RAT that provide the ability of a spatially aware wireless node to determine a relative position or a relative orientation of another of the one or more of the spatially aware wireless nodes in the network.

As used herein, the term "network configuration" refers to a spatially aware wireless network that is configured to carry out a specific task or function based on the spatial arrangement of one or more key node(s) in the network.

As used herein, the term "key node" refers to a node whose position is determined to assign permissions in a network or whose position is determined to define a network configuration. The permissions may be assigned to the key node or to other nodes in a wireless network, based on a spatial arrangement of the key node or one or more nodes relative to the key node in the wireless network.

As used herein, the term "key node group" refers to a group of nodes whose position is determined to assign permissions in a network or whose position is determined to define a network configuration. The permissions may be assigned to the nodes in the key node group or to other nodes in a wireless network, based on a spatial arrangement of the key node group or one or more nodes relative to the key node group in the wireless network.

As used herein, the term "key node colony" refers to each node in a wireless network. Permissions may be assigned to one or more nodes in the wireless network based on the positions of each of the nodes in the wireless network. Alternatively, the position of each of the nodes in the network is determined to define a network configuration.

As used herein, the term "spatial characteristic" refers to a spatial relationship, comprising a relative orientation and a relative position (distance) of one or more nodes within a spatially aware wireless network relative to one or more other nodes within the spatially aware wireless network.

As used herein, the term "mobile computing device" refers to a device including a digital processor coupled to a digital memory. The mobile computing device may be a simple device operable to receive a signal and respond. Alternatively, the mobile computing device can be a complex device having multiple processors and a display screen.

As used herein, the term "permissions" refers to a granting of access or authorizing an action or process to occur or initiating a change in behavior. The permission may be for a wireless node, or a device connected to the wireless node.

As used herein, the term "radio frequency" or "RF" is used to describe non-proximate far-field propagated electromagnetic radiation used to communicate information via an RF transceiver or RF radio. The power roll-off for an RF electromagnetic signal is approximately one over the distance squared ($1/(dist^2)$), meaning that power density of the emitted RF signal will be one fourth (¼) as strong as the distance between the emitted RF signal and the RF transmitter is doubled.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Wireless communications networks are typically designed to enable the transmission and reception of information. More recently, the transmission and reception of information has been enhanced based on location information. For example, a location of a receiving device can be used to determine what type of information to communicate. Using triangulation, or other location techniques, the location of a receiving device can be determined, and relevant information can be communicated to the receiving device based on the device's location. For example, a user may submit a query for a selected restaurant's location using a wireless phone. The results of the search can be communicated to the receiving device (i.e. wireless phone) based on the location of the wireless phone. The location of the receiving device provides a single dimension (i.e. a fixed location in time).

As the development of the wireless communication infrastructure continues, more and more devices will be configured to communicate over the internet. This infrastructure is commonly referred to as the internet of things (IoT). As the number of devices with wireless connectivity increases, it provides opportunities to develop wireless networks that can operate in new ways.

For example, network nodes can be configured to be aware of the relative spatial position, orientation, or velocity of other nodes in a network. A spatially aware network is a network that is configured to make decisions based on the relative position and orientation of nodes in the network at any point in time. This spatial awareness in a network can provide an infrastructure for advanced wireless network capabilities, such as context aware networks, cognitive networks, and artificial intelligent networks. Example networks are included in, but not limited to: U.S. patent application Ser. No. 14/841,404, filed Aug. 31, 2015; U.S. patent application Ser. No. 14/841,408, filed Aug. 31, 2015; U.S. patent application Ser. No. 14/841,420, filed Aug. 31, 2015; U.S. patent application Ser. No. 14/841,426, filed Aug. 31, 2015; and U.S. patent application Ser. No. 14/841,435, filed Aug. 31, 2015, each of which are hereby incorporated by reference in their entirety. Once a network is configured to be spatially aware, the network can issue specific permissions or define a network configuration based on "knowledge" or information pertaining to the positions or orientations of the nodes in the spatially aware wireless network. The ability to determine the position(s) and/or relative orientation(s) of a node relative to another node in the spatially aware wireless network is further described in U.S. Pat. Nos. 7,532,901 and 8,410,775 which are herein incorporated by reference in their entirety.

A network can be configured to carry out a specific task or function based on the spatial arrangement of one or more key node(s) in the network. When a network is configured to a specific task or function, nodes within the network will be issued permissions to direct the purpose of that particular node. A node may receive permissions for multiple behaviors, including the function of assigning permissions to other nodes, or participating in network arbitration or selecting which nodes are key nodes, and or which nodes receive specific permissions. A network with no specified configuration can assume a default configuration state where specific nodes monitor the spatial arrangement of the network in order to determine when a threshold event or condition occurs.

For instance, in accordance with one example, a spatially aware wireless network can be developed in which one or more nodes in the network is spatially aware of the relative position, and orientation of one or more other nodes in the network. Just as the ability to determine a single dimension location of a node has improved our ability to communicate information, the ability to determine multi-dimensional spatial awareness of one or more nodes within a network will further enhance a wireless networks ability to provide useful information.

The content communicated by, or actions taken by a spatially aware wireless node can be related to or associated with the spatial awareness of another node in the wireless network. A spatially aware wireless network can significantly improve the ability of one or more nodes in the network to behave more intuitively. This intuitive behavior will allow people to naturally interact with everyday objects, with the objects able to perform actions based on their location, position, and/or orientation relative to other nodes, thereby allowing IoT enabled devices to naturally become part of our everyday lives.

The position of one or more key node(s) in a spatially aware wireless network may enable a different permission or network configuration to be configured based on the same Spatial Arrangement of the key node(s). In one embodiment, a spatial arrangement determination can be dynamic based on how the current spatial arrangement came to be. For example the movement of nodes or key nodes in the spatially aware wireless network can be monitored. The trending movement of nodes or key nodes, predictions of future movements of the nodes or key nodes, the velocity of the nodes or key nodes, and so forth, can be monitored.

For example, a wireless spatial network may have nodes located on the user's wrist watch, phone or phone case, on the user's belt, on a bracelet on the user's other wrist, at the user's laptop computer, the laptop keyboard, and in an external mouse. The spatial arrangement of a user placing their hand on the computer mouse may enable permissions within the network.

If the user's hand was previously on the laptop computer keyboard, and then moved to the external computer mouse, the network may instruct the computer to disable the laptop touch pad.

If the user was previously away from their computer (out of the network) and now placing their hand on the external computer mouse (presenting the same spatial arrangement that previously existed) the network may issue a permission to unlock the laptop. Accordingly, the ability to track changes in movement of spatially aware wireless nodes in a spatially aware wireless network can enable the network to be configured based on a history of the changes, thereby enabling the network to be configured in different ways, to perform different actions, even when the movement of the spatially aware wireless nodes results in the same end spatial arrangement of the spatially aware wireless nodes in the spatially aware wireless network.

In another example, a spatially aware network in a vehicle may consist of spatially aware wireless nodes embedded in multiple passenger's phones, as well as various locations in the vehicle. The network may instruct the vehicle to adjust the temperature settings at each passenger's location to each passenger's defined preferences. If a passenger leaves the vehicle and returns to the same location in the vehicle a few minutes later (presenting the same spatial arrangement that previously existed), the network, based on determining the spatial arrangement changes of the network, can issue permissions to increase the temperature setting of the vehicle at that particular passenger's location for a temporary time period to warm the passenger back up, before reducing the temperature to a lower setting to keep the passenger warm.

The permissions and/or network configuration can be selected based on the dynamic monitoring of the movement of nodes or key nodes in the spatially aware wireless network. Different movements, predictions of future movements, velocities, and so forth of the nodes or key nodes can result in different network configurations or assigned permissions. In another embodiment, network configurations and/or assigned permissions in the spatially aware wireless network can be based on what devices are connected to the spatially aware wireless network or what capabilities are available to the spatially aware wireless network. The capabilities may be based on one or more node's capability(s) and/or the capabilities of a device that is coupled (wirelessly or wired) to one or more nodes or key nodes in the spatially aware wireless network. In one embodiment, the movement of the nodes or key nodes can be recorded or monitored. A velocity of the one or more nodes or one or more key nodes can be determined based on a change of a position of the key node over a predetermined time interval. In addition, a radial velocity of one or more nodes or key nodes can be determined based on a change of a determined orientation of the node(s) or key node(s) in a predetermined time interval.

In one example, the spatially aware wireless network can be configured based on the change of position or the change of orientation of the one or more nodes or key nodes.

Data Collection

Data can be collected at the spatially aware wireless network, accessed by the spatially aware wireless network, and/or stored by the spatially aware wireless network.

Examples of information or data that can be collected from outside of the network include data collected from: remote sensors (in communication with one or more nodes in the network), an input device (keyboard, camera, microphone, HID . . . ), external memory storage (database, other networks, internet connection, server, hard drive . . . ), or the like.

Additional data may be gathered by more than one node. This data may be unique to each node, or the same data may be available to more than one node but parsed between multiple nodes. The parsing of data can increase security by reducing the available information exposed to a breach in the data flow between nodes or data stored at one or a few nodes. Additionally, data may be redundantly collected by more than one node.

Data Storage

Information within the spatially aware wireless network, or accessible by the spatially aware wireless network, can be stored based on a spatial arrangement determination. Data may be parsed with or without heuristics and distributed to one or more nodes within the network. As previously discussed, the parsing of data can increase security since a single node or even multiple nodes may not contain enough information to reassemble the data. The data may be stored localized to, or within nodes most likely to access the information. In addition, data can be stored in a way that allows it to be redundant across two or more nodes in the spatially aware wireless network. Certain nodes may act as storage nodes accessible to other nodes based on special arrangement (most centrally located, located near an external access point, located away from an external access point . . . ). Data storage arbitration may be made locally or by a limited number of key nodes in order to increase security by limiting storage algorithms within the network.

Data Access

The spatial arrangement of the spatially aware wireless nodes in the spatially aware wireless network can enable or initiate (permit) one or more nodes in the spatially aware wireless network to access data stored within the network. Data access may be permitted for only one node, or for multiple nodes. Permissions may simply allow (notify) one or more nodes to access the specified data, or a permission can be communicated to transfer data access capability to the permitted nodes (such as an encryption key, or the address to the location of permitted data) to enable nodes to access data that was previously not available.

In accordance with one embodiment, a spatially aware wireless network can be configured using a near field magnetic induction radio access technology that uses spatial diversity to enable one or more nodes in the spatially aware wireless network to determine relative positions and orientations of other node(s) in the spatially aware wireless network. This will be more fully described in the proceeding paragraphs.

NFMI Communication for Spatial Awareness

A spatially aware wireless network can be configured using Near Field Magnetic Induction (NFMI) communication. Unlike typical Radio Frequency (RF) communication signals, which are created by modulating information onto an electromagnetic plane wave and transmitting those signals into free space, NFMI signals are created by modulating information onto a magnetic field. The magnetic field is localized around the transmitting antenna. The signal outside of this localized region is typically attenuated below the noise floor, thereby making it difficult or impossible to receive the signal outside of the localized region. An NFMI node can be configured to take advantage of two characteristics of an NFMI signal: polarization and a rapid power roll-off. Multiple nodes configured to take advantage of these characteristics can be used to create a spatially aware wireless network.

In addition, node-to-node spatial determination can be very accurate using NFMI due to the rapid attenuation or roll-off of the magnetic field signal. Small changes in relative position between nodes can produce large changes in magnetic coupling. This can provide a relatively high resolution determination of spatial relationships between nodes in the network.

Another benefit to using NFMI is the added security provided by the rapid roll-off. Information exchanged within the network using NFMI can be more secure than information communicated using RF communication since the energy signals in NFMI communication remain substantially localized around the network nodes, with minimal radiation beyond the network boundary.

The presence of each node in the network can be detected by other nodes by monitoring and detecting changes in the magnetic field energy at each node or within the network. These changes in energy are the result of magnetic induction coupling between transmitting nodes and nodes receiving the magnetic field signal. Unauthorized nodes that consume magnetic field energy while receiving magnetic signals or 'listening in' to network's communications can be detected. Once detected, changes can be made to the network configuration and mitigation steps can be made by the network such as generating an alert notification, restricting the transmission of secure data, or identifying the spatial location of the unauthorized node within the network, or the like.

NFMI communication also significantly reduces the volume of space in which wireless signals propagate via magnetic field energy. This reduces the threat potential since it becomes more difficult for unauthorized nodes or users to enter the network boundary unprotected.

The reduced volume of space in which the wireless signals propagate also reduces interference with other networks. Multiple NFMI personal area networks can be located within several feet of each other (i.e. 3 to 30 feet dependent on system configuration) with minimal interference between the networks.

In addition, spatial location detection using an RF RAT typically involves triangulation of three or more separate transceivers, with one or more transceiver positioned outside of the wireless Personal/Local Area Network. The use of NFMI with polarization, magnetic induction diversity, and/or spatial diversity offers spatial position and orientation detection by utilizing a plurality of antenna on a single transceiver within a wireless PAN, thereby dramatically simplifying the provision of spatial awareness to a wireless Personal Area Network, and advancing the art of context aware personal area networking.

NFMI Polarization

Magnetic field signals are polarized—meaning, the amount of inductive coupling between a transmitter antenna and a receiver antenna is dependent on the alignment or spatial orientation of one antenna relative to the other antenna.

When the transmitter antenna and receiver antenna (e.g. a conductive coil, a ferrite-wound coil, an air-core coil, a meta-material antenna, and so forth) are coplanar or co-axial, the inductive coupling between the antennas is most efficient.

When the relative angular alignment between the transmitter antenna and the receiver antenna is moved away from coplanar or co-axial, the magnetic inductive coupling is reduced by the cosine of the angular displacement. When the angular displacement is zero degrees (coplanar) the inductive coupling scale factor is one. When the angular displacement is ninety degrees (perpendicular or relatively orthogonal) the magnetic coupling scale factor is zero. In principal, some signal may be received at an angle of approximately 90 degrees. However, there is significant attenuation.

One characteristic of NFMI communication is the polarization of a transmitted signal relative to the transmitter and receiver antennas. Maximum power in an NFMI signal can be communicated between two NFMI antennas with axes that are parallel to one another (i.e. coaxial). Minimum power is transmitted between coaxial antennas when the antenna axes that are perpendicular to one another (i.e. an angular displacement of 90 degrees). The polarization characteristic and rapid power roll-off of NFMI communication can increase the complexity of NFMI communications relative to typical RF communications, since the movement of the transmitter and/or receiver can significantly affect the received signal power.

The polarization characteristic and rapid power roll-off of NFMI communication can be advantageous for developing a spatially aware wireless network. The polarization characteristic can be used to transmit and receive a polarized NFMI signal within the spatially aware wireless network to determine a relative orientation and position of one or more nodes in the network.

The determination of the relative orientation and position can be determined based on the received signal at the physical layer. The use of the physical layer to communicate spatial information or a polarized signal between nodes enables the spatially aware wireless network to operate in real time or near-real time (i.e. in microseconds or milliseconds). In addition, the use of the physical layer to communicate a polarized NFMI signal can provide added reliability and stability to the spatially aware wireless network.

Many RF-based RAT networks require that one or more of the network nodes (i.e. cell tower, base station, evolved Node B (eNB), access point, and so forth) to remain stationary at a fixed point in order to determine the relative location of other nodes in the network. However, spatially aware networks using polarized magnetic induction diversity can be configured to determine the spatial arrangement of all of the nodes in the network without any node being required to remain in a fixed or defined location.

In one example, a polarized signal transmitted from one node (i.e. a transmitter node) can be detected at another node (i.e. a receiver node) and used to determine the spatial configuration (i.e. orientation and position) of the receiver node relative to the transmitter node.

For example, the orientation of one node may be determined to be −45 degrees on the Z axis, 20 degrees on the X axis, and 55 degrees on the Y axis, relative to a reference node's X, Y, and Z axes. The position may be determined to be 10 feet, based on a measured magnitude or amplitude of the received polarized NFMI signal(s) across multiple substantially orthogonal planes. In one example, the signals can be received on multiple orthogonal antennas.

It should be noted that most nodes typically comprise an NFMI transceiver that is capable of both transmitting and receiving. Examples are provided for transmitter nodes and receiver nodes to provide clarity in the examples, with the understanding that the example nodes can both transmit and receive unless otherwise stated.

Single Transmit Plane to Multi-Planar Receiver

If multiple antenna are positioned in the receiving side of a magnetic induction communication link, and the antennae are positioned on planes relatively perpendicular to one another (X, Y, Z orientation), the transmitted magnetic signal will be received at the X, Y, and Z antennae in a unique combination of signal magnitudes across the multi-planar antenna.

This unique combination of signals can be analyzed or mapped and used to determine the relative orientation and position between transmitter and receiver nodes.

Multi-Planar Transmitter to Single Receiver Plane

If multiple antenna are positioned in the transmitting side of the magnetic induction communication link, and the antennas are positioned on planes relatively perpendicular to one another (X, Y, Z orientation), the transmitted magnetic signals will be received at a receiver antenna in a unique combination of signal magnitudes.

The multi-planar transmitted signals, transmitted on the physical layer of the NFMI RAT, can be identified at the receiver by transmitting the signals in a predetermined sequence that is known at the receiver (i.e. the X-oriented signal is transmitted first, followed by the Y-oriented signal, and then the Z-oriented signal). The receiving node can analyze the received signals and compare the properties (i.e. phase and amplitude) of each signal to determine the relative orientation and relative position between the nodes.

Alternatively, the multi-planar transmitted signal(s) may be out of phase from one another so that the orientation of each plane can be identified and analyzed by the receiving node.

Alternatively, the multi-planar transmitted signal(s) may include encoded information which can be used at the receiver to identify with which plane or orientation the transmitted signal is associated with.

This unique combination of signals can be analyzed or mapped and used to determine the relative orientation and/or relative position between transmitter and receiver nodes, based on the phase and amplitude of the received signals.

Multi-Planar Transmitter to Multi-Planar Single Receiver

If the transmitted signal is generated on more than one relatively orthogonal antenna or plane and received on multiple planes or received on multiple antennas, with each antenna positioned on relatively orthogonal planes, the relative orientation and/or relative position of the transmit-receive pair can be more accurately determined by comparing both magnitude and/or phase of the received signal(s).

Spatial Configuration Determination Using Polarized Signal Detection

There are a number of different techniques that can be employed to use the polarized signal to identify the spatial configuration of a transmitter node relative to a receiver node. By altering a signal's timing, phase, frequency, amplitude, or types of modulation techniques, the signal can be detected and a determination of the spatial characteristics between the transmitter and receiver can be determined.

In one example, either the transmitter node or the receiver node can be configured with two or more antennas. Two or more substantially orthogonal antennas located at a node can be used to maximize a detection of a polarization difference received at each antenna. However, it is not necessary for the antennas to be perfectly orthogonal. For example, a relatively low cost, low complexity wireless communication system may have relatively large tolerances for antenna orthogonality, such as two or more antennas with relative angles of 90 degrees+/−20 degrees. Alternatively, a relatively high cost, high performance wireless communication system may have a fairly low tolerance for antenna orthogonality, such as angles of 90 degrees+/−2 degrees. The actual design constraints of the antenna angles can be dependent upon the system constraints and system cost.

In one example, the receiver node can include two or more antennas. Each antenna can measure one or more of the phase, amplitude, and timing of the polarized transmitted signal communicated from the transmitter node (via one or more transmitter node antenna(s)). The phase, amplitude and timing information received at the receiver node can be used to determine a relative orientation and/or relative position of the transmitter node relative to the receiver node by determining a distance, and a relative angle of antennas between the nodes.

Alternatively, the transmitter node can include two or more antennas. Each antenna can communicate a signal (i.e. the same signal) with a same or different phase, amplitude, or frequency. The signals transmitted from the two or more antennas of the transmitter node can be received at one or more antennas at a receiver node. The signals can be analyzed to determine a two dimensional or three dimensional spatial characteristic of the transmitter node relative to the receiver node.

In another example, a plurality of nodes, or each node, in a spatially aware wireless network can include two or more substantially orthogonal antennas. Polarized NFMI signal(s) can be communicated (i.e. transmitted and received) between the nodes. The received signals at one or more nodes in a spatially aware wireless network can be analyzed to determine a relative spatial configuration between the nodes in the spatially aware wireless network.

In one example, the spatially aware wireless network can be configured to minimize overhead used to determine the spatial characteristics between the nodes. For example, by communicating a signal from one or more antennas on the physical layer with a known frequency, phase, or amplitude characteristic at each of the one or more antennas, no additional overhead information may be necessary to determine the relative spatial characteristics between the nodes in the spatially aware wireless network.

Alternatively, additional overhead information may be communicated to enable a simplification of the transmit/receive nodes in the spatially aware wireless network. For example, information, such as packetized data, transmitted from an x-oriented antenna, y-oriented antenna, and/or z-oriented antenna can include overhead information identifying from which antenna the packet was transmitted. This information can then be used at the receiver node to determine the spatial configuration of the transmitter node relative to the receiver node. Communicating the additional overhead information can allow the relative spatial configuration of the nodes in the spatially aware wireless network to be determined with radio components and processors having reduced complexity relative to nodes configured to detect the relative spatial configuration of nodes in the spatially aware wireless network without the overhead information.

For example, a polarized spatial position signal transmitted by each antenna can comprise a pulsed NFMI signal, or a coded pulsed NFMI signal. A coded pulse can comprise information encoded in a signal. Alternatively, the signal may have its phase, amplitude, or frequency altered in a way that makes it discernable from other signals. For example, a polarized spatial position signal from an antenna with an X orientation may be pulsed at 10 MHz, while another relatively orthogonal antenna can be pulsed at 11 MHz, or another desired frequency. Each antenna can transmit a signal that is discernable from the polarized spatial position signal(s) transmitted by other relatively orthogonal antennas. The coded information can be unique on each of the relatively orthogonal antennas. For example, the X orientation may transmit a different signal or coded information or pulse pattern than the antenna in the Y orientation. With the ability to discern each signal, the relative orientation and position of a transmitting node can be determined by each node that receives the polarized spatial position signal(s).

In one embodiment, the use of multiple antennas to communicate a signal is referred to as antenna diversity. When the multiple antennas are used to communicate a magnetic induction signal, magnetic induction diversity refers to the use of multiple orthogonal antennas that are directly connected to a single transceiver. This is different than antenna diversity used in transmission schemes such as Multiple Input Multiple Output (MIMO), wherein multiple antennas are used to perform spatial multiplexing to decrease signal loss through channel fading. Spatial diversity, as used herein, is the use of multiple orthogonal antennas to transmit or receive a magnetic induction modulated signal configured to allow a received NFMI signal to be analyzed to determine a two dimensional or three dimensional spatial characteristic between the transmitter and receiver nodes in the spatially aware wireless network.

NFMI Power Roll-Off

The power roll-off for an electromagnetic signal is one over the distance squared ($1/(dist^2)$), meaning that every time the distance is doubled, the power is one fourth (¼) as strong. In contrast, the power roll-off for a NFMI signal is proportional to one over the distance to the sixth ($1/(dist^6)$), meaning that every time the distance is doubled, the power is one sixty-fourth (1/64) as strong.

The rapid power roll-off of an NFMI communication, relative to RF communication, can be used to enable a spatially aware wireless network to operate effectively by reducing radio RF spectrum saturation. A typical radio frequency communication scheme, such as Bluetooth® or Wi-Fi, is configured to communicate signals a distance of hundreds to thousands of feet. This can be advantageous when it is desired to communicate relatively long distances. However, in the envisioned future of the Internet of Things, when nearly everything includes a wireless node, the available bandwidth is limited. If thousands of devices are each communicating thousands of feet, the RF spectrum can quickly become saturated and devices are unable to communicate effectively. The rapid roll-off of NFMI communication can significantly reduce the RF spectrum saturation. However, the polarization of NFMI signals relative to the transmitter and receiver antennas can complicate communication between nodes.

Maximum power in an NFMI signal can be communicated between two NFMI antennas with axes that are parallel to one another. Minimum power is transmitted between two antennas with antenna axes that are perpendicular to one another. The difference in received power between parallel and perpendicular antennas on a receiver can be substantial.

For instance, at 1 meter, the power received in an NFMI signal transmitted between two antennas that are substantially parallel to each other can be 50 decibels (dB) greater than the power received when one of the antennas is substantially perpendicular to the other.

The transmitter typically has no way of knowing the orientation of the receiver antenna, therefore a worst case scenario can be assumed and the transmitter can be configured to transmit at the maximum (worse case) power setting of +50 dB to ensure a link distance of 1 meter when the antennas are perpendicular with one another.

In an NFMI system, the power roll-off is 60 dB per decade. Therefore 50 dB correlates to 0.833 decades (50 dB/60 dB) or an increased link distance of 6.8 times (10^0.833). Thus, if the transmitter and receiver antenna are optimally positioned (i.e., parallel) while the transmitter is at full power (+50 dB), the link distance will reach out to 6.8 meters instead of 1 meter. This means that an NFMI link will have a range from approximately one to seven meters. This wide range, which depends on the orientation of the transmitter and receiver antennas, substantially reduces the ability to sharply define a selected proximity (i.e. distance) around a location or object at which it is known with a relatively high degree of confidence that a signal can be received. This distance is referred to as a proximity edge. The polarization of the NFMI signal can create a variable proximity edge, depending on the angular displacement of the transmitter antenna relative to the receiver antenna.

One way of dealing with the challenge of a variable proximity edge caused by antenna misalignment (angular displacement) is to design one or both of the transmitter and receiver with multiple orthogonal antennas. This ensures that at least one of the receiving antennas at a receiving node will be substantially parallel to the transmitting antenna at the transmitting node regardless of the relative alignment between the transmitter and the receiver. In one embodiment, the signal can be received at a receiver having multiple orthogonal antennas. A portion of the signal can be received on each of the orthogonal antennas and summed, thereby maximizing the signal no matter the orientation. Alternatively, one or more of the antennas can be selected to transmit or receive based on the strength of the signal.

The use of multiple orthogonal antennas to receive a magnetic induction modulated signal is referred to herein as magnetic induction diversity. In one embodiment, the use of magnetic induction diversity can be used in combination with spatial diversity to allow the benefits of both spatial diversity and magnetic induction diversity to be accomplished.

Magnetic induction diversity can be the selection of the best aligned antenna to receive or transmit with another transceiver. Alternatively, magnetic induction diversity can involve summing the signal on two or more antennas. The use of magnetic induction diversity enables the variability of the proximity boundary to be substantially reduced. Since, in a system with multiple receiver antennas positioned in orthogonal planes, a receive antenna can always be selected that is significantly aligned (i.e., parallel) with a transmit antenna, it reduces the need to significantly increase the transmit power to ensure that the signal can be received at a selected distance independent of its relative orientation with the transmit antenna, and vice versa.

It should be noted that the mere use of NFMI transceivers does not, by itself, constitute a device capable of defining a proximity boundary with desired dimensions using magnetic induction diversity. The distance over which a magnetic induction device can communicate (i.e. a range) when using magnetic induction diversity can depend on a number of factors, including but not limited to a communication range of a transmitter, a receive sensitivity of a receiver, and a carrier frequency of the magnetic induction signal. A number of additional factors can also contribute including the degree of orthogonality, the number of transmit and receive antennas, the shape and size of the antennas, the transmitter output power, the efficiency of the receiver, and so forth. A standard communication device with multiple NFMI transceivers is not specifically designed with each of the above criteria carefully selected to provide a specifically selected communication range to define the dimensions of a proximity boundary. Accordingly, the standard communication device cannot be used to define a proximity boundary since one or more of the above criteria may not be met and would result in an undefined proximity boundary due to signals being transmitted beyond the proximity boundary or too weak to reach the proximity boundary.

In one embodiment, the spatially aware wireless network, as described herein, provides proximity based spatial awareness by using both magnetic induction diversity and spatial diversity. Only nodes that are within a defined proximity, such as within a proximity boundary, are operable to determine a relative spatial orientation of other nodes within the proximity boundary. The nodes within the defined proximity can significantly reduce the number of nodes. This reduced number of nodes can significantly simplify the ability to determine the orientation and position of multiple nodes or all nodes within the spatially aware wireless network. In addition, the fast roll-off of the NFMI signal can allow sufficient change in transmitted and received signal power within a relatively small proximity boundary (i.e. 3 feet to 30 feet diameter) to enable the relative orientation and position of the transmitting node(s) and receiving node(s) to be determined.

Spatially Aware Network Configuration

A spatially aware wireless network can be comprised of a plurality of spatially aware nodes 102a, 102b and 102c, as illustrated in the example of FIG. 1a. In one embodiment, each node in the spatially aware wireless network can include two or more substantially orthogonal antennas. In this example, each spatially aware node 102a, 102b, and 102c is illustrated as having three orthogonal antennas, labeled X, Y and Z. Alternatively, selected spatially aware nodes in the spatially aware wireless network can include only a single antenna, and other spatially aware nodes can include the two or more substantially orthogonal antennas.

In one embodiment, illustrated in the example of FIG. 1a, each spatially aware node 102a, 102b, 102c in the spatially aware wireless network can have a different proximity boundary 108a, 108b, 108c. For example, each node may be configured to have a proximity boundary with a radius of approximately 10 feet. A first spatially aware node 102a can determine the relative spatial orientation of other nodes 110 that are within 10 feet. A second spatially aware 102b node may be on an edge of the proximity boundary 108a of the first spatially aware node. The proximity boundary 108b of the second spatially aware node can continue another predetermined distance, such as 20 feet. A third spatially aware node 102c may have a proximity boundary with a diameter of 15 feet.

The example of a 10, 15 and 20 feet diameters for proximity boundaries is not intended to be limiting. A spatially aware node can be designed to have a selected proximity boundary, which may range from several inches to 30 feet or more. The shape of the proximity boundary can also be designed to have a predetermined shape, such as round, oval, square, or rectangular. The antennas on the spatially aware node can be designed to provide a radiation pattern of a desired shape, such as a narrow arc or a conical pattern.

A plurality of spatially aware nodes in the spatially aware wireless network can be configured to communicate polarized signals using NFMI. The polarized signals transmitted from each antenna can be configured and/or communicated in a way that allows the relative spatial orientation and position of the nodes in the spatially aware wireless network to be determined, as previously discussed.

Figure 2:
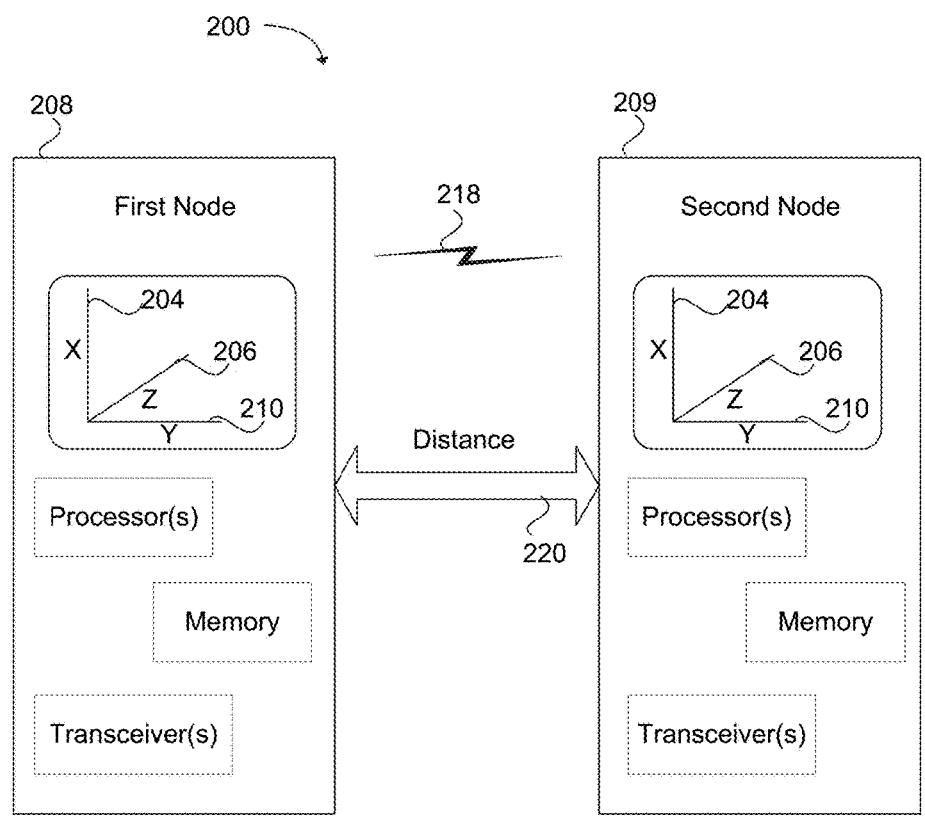
FIG. 2 illustrates a block diagram of a first spatially aware wireless node and a second spatially aware wireless node with multiple orthogonal antennas to provide a polarized spatial position signal in accordance with an example.

As illustrated in the example of FIG. 2, a spatially aware wireless network 200 can comprise multiple spatially aware nodes 208, 209. Each spatially aware node can include one or more antennas. One or more spatially aware node in the spatially aware wireless network 200 typically includes two or more substantially orthogonal antennas.

In the example of FIG. 2, a first spatially aware node 208 and a second spatially aware node 209 each include three orthogonal antennas 204, 206, 210. Each spatially aware node 208, 209 also include one or more processor(s), memory, and one or more transceiver(s). For example, each spatially aware node can include a baseband processor and an application processor. The spatially aware nodes can include multiple transceivers from a single RAT, such as NFMI to allow multiple transmit/receive chains. In addition, the spatially aware nodes can also include other wireless personal area network (WPAN), local area network (WLAN), or wide area network (WAN) nodes, such as Bluetooth, Near Field Communication (NFC), WiFi, and/or 3GPP LTE transceivers.

Examples of WLAN RATs include, but is not limited to, nodes configured to operate using the Bluetooth standard, and/or the Institute of Electronics and Electrical Engineers (IEEE) 802.11-2012, 802.11ac-2013, 802.11ad, 802.11ax, IEEE 802.15, or IEEE 802.16 standards. An example of a WWAN RAT standard is the Third Generation Partnership Project (3GPP) Long Term Evolution (LTE) Release 8, 9, 10, 11, or 12. Nodes in the spatially aware wireless network can be configured to communicate selected information using the NFMI RAT, and other types of information using the WLAN or WWAN RATs. In addition, the spatially aware wireless network can communicate information to other nodes in the network, or to devices and/or servers in communication with one or more nodes in the spatially aware wireless network, via a wired connection to one or more nodes in the network.

The size of the spatially aware wireless network 200 may be determined by the proximity range of the NFMI transceivers in the first node 208 and the second node 209. The distance 220 over which the transceivers can wirelessly communicate 218 a polarized NFMI signal can set the size of the spatially aware wireless network 200.

Figure 3:
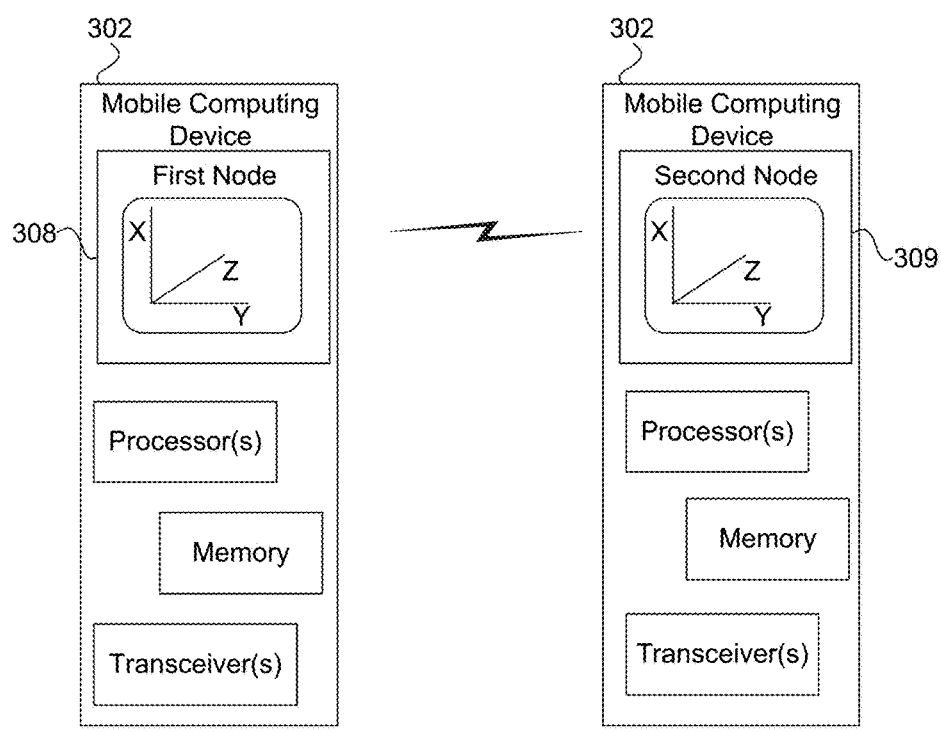
FIG. 3 illustrates a block diagram of a mobile computing device with an spatially aware wireless node having multiple orthogonal antennas to provide a spatial location signal in accordance with an example.

As illustrated in FIG. 3, one or more of the spatially aware nodes 308, 309 can be coupled to a computing device 302 configured to provide a level of cognition, such as the ability to identify other spatially aware radio transceivers and dynamically configure the spatially aware radio transceivers to form a spatially aware wireless network. In one example, each computing device 302 can additionally comprise memory, processor(s), and transceiver(s).

The mobile computing device can be designed to use a general purpose computer circuit, such as an x86 processor or an ARM based processor. Alternatively, an application-specific integrated circuit (ASIC), a programmable logic device such as a Xylinx processor, a very large scale integrated circuit (VLSI), a system on a chip (SOC), or another desired type of processor(s) can be used.

In one example, the computing device 302 may include a faster processor than the spatially aware nodes 308, 309. The computing device may also include different RATs. For example, each spatially aware node 308, 309 may only include an NFMI RAT. The computing devices may include additional wireless PAN, LAN, and/or WAN RATs, as previously discussed. The transceiver(s), memory, and processor(s) can enable changes in the spatial orientation of nodes to be recorded, stored, and communicated over time. The spatially aware node can also be in communication with an electronic device, such as a measurement device, test equipment, medical equipment, an input device (keyboard, camera, microphone, a human input device (HID)), an external memory storage (database, other networks, internet connections, server, hard drive, solid state drive . . . ), or the like.

The mobile computing device 302 can be embedded in a wide variety of products, objects, or devices, such as medical devices, sporting goods products, toys, military equipment, or any other type of device in which a determination of the distance, angle and relative orientation relative to another object is desired.

Data in the spatially aware wireless network can be distributed among multiple nodes. The data can be distributed such that the data is redundant across two or more nodes. Certain nodes may act as storage nodes that are accessible to other nodes based on a predetermined arrangement. For example, a node that is centrally located, located near an external access point, or located away from an external access point may be designated as a storage node. In one embodiment, information within the spatially aware wireless network can be stored by nodes within the network. The data may be parsed with or without heuristics and distributed to one or more nodes within the network. This can increase security since one node does not contain all of the data, or enough data to recover the data.

In one example, data can be stored at random locations within the spatially aware wireless network. Alternatively, data can be stored at locations of nodes within the spatially aware wireless network that are most likely to access the information, in a daisy chain configuration. Storing the data in a daisy chain configuration can reduce the latency of node to node access of the data, and reduce the number of hops needed for data to be accessed, relative to a random distribution of data within the nodes. The organization of data within the network based on location can also increase security by limiting the transfer of information between nodes.

In another example, data can be stored by nodes within the spatially aware wireless network in a star configuration, providing parallel access to data via peer to peer communication. Data parsed and stored in multiple nodes that surround a node designated to access the data can be more quickly transferred to the target node using multi-point to point communication. This can increase efficiency and security.

Data storage arbitration can be made locally, or by a limited number of nodes in order to increase security by limiting storage algorithms within the network.

Spatial Network Configuration

A spatially aware wireless network 120 can be configured based on the spatial configuration of a key node within the network relative to other nodes within the network. In certain embodiments, a network can be configured in a predetermined way based on the relative spatial configuration of: (1) the key node 102*a*; (2) a key node group 102*a*, 102*b* and 102*c*; and/or (3) a key node colony 102*a*, 102*b*, 102*c*, and 110.

In one embodiment, each spatially aware wireless node in a spatially aware wireless network can be configured as a transceiver used to send and/or receive selected data, or repeat data that is received. One or more spatially aware wireless nodes can be coupled to a mobile computing device or coupled to a fixed computing device. The mobile computing device can be a handheld computing device, a portable multimedia device, a smart phone, a tablet computing device, a body worn device, a body area network device, a personal area network device, a laptop computer, an embedded computing device, or another similar device.

An embedded computing device is a computing device that is inlayed in a selected product, object, or device such as a vehicle, a watch, a bracelet, a key fob, a ring, a key card, a monitoring device, a medical device, sporting goods products, toys, military equipment, a remote sensor, a measurement device, a dispensing device, a clipboard, an implanted medical device, a token, a poker chip, a souvenir, a necklace amulet, an electronically enabled article of clothing, an appliance, a tool, a weapon, or any other type of device in which the relative position and/or orientation is desired. The mobile computing device can be a device that is user owned, rented, leased, associated with, or otherwise in the possession of the user. A user owned device can include mobile computing devices that are actually owned by relatives, friends, and employers of the user.

Figure 1B:
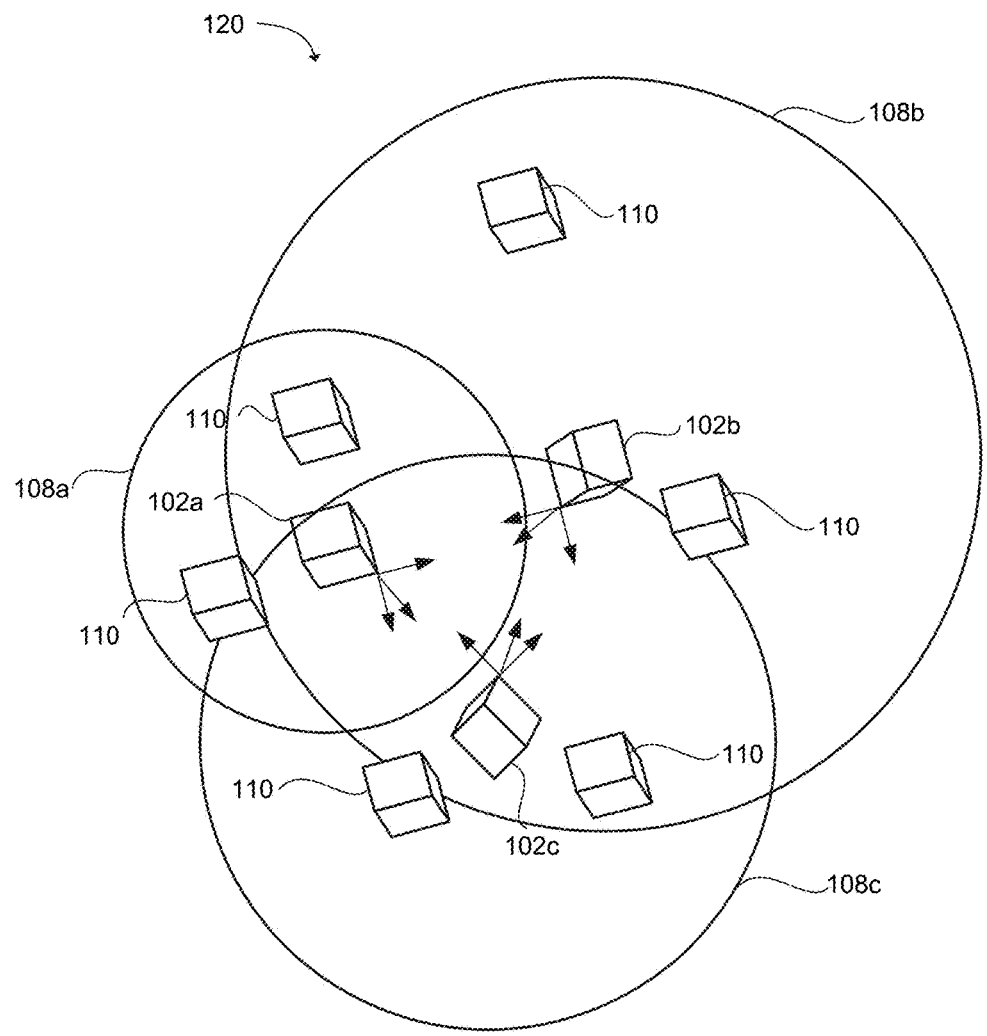
FIG. 1b illustrates another example of a spatially aware wireless network in accordance with an example.

FIG. 1*b* shows one example embodiment of a spatially aware wireless network 120. One spatially aware node within the spatially aware wireless network can be designated as a key node 102*a*. In one embodiment, the key node 102*a* can assign permissions, to itself or other nodes in the spatially aware wireless network. A permission can refer to a granting of access or authorization of an action or process to occur. The permissions can be assigned, based on a spatial arrangement of one or more nodes in the spatially aware wireless network 120.

In one example, the key node 102*a* can be statically selected based on predetermined criteria or dynamically selected based on the location, position, and/or orientation of the key node(s) 122 or other nodes relative to the key node(s) that are in the spatially aware wireless network 120.

Static selection criteria for a key node can include node operational parameters, including but not limited to: node batter power, communication range, communication capabilities (i.e. multiple antennas), multiple RATs at the node, or other types of selected operational parameters. In addition, a node may send a request to other nodes within the spatially aware wireless network 120 that requests to be the key node. Alternatively, the key node may be pre-programmed or pre-configured to be the key node.

In another embodiment, the key node 102*a* may not assign permissions to itself or other nodes. Rather, the network 120 can be configured via intra-network or inter-network configuration based on the spatial configuration of (1) the key node 102*a*; (2) the key node group 102*a*, 102*b* and 102*c*; and/or (3) the key node colony 102*a*, 102*b*, 102*c*, and 110 relative to other nodes. An intra-network configuration can occur when the network is configured by a device within the network, such as a node 102*a*, 102*b*, 102*c*, or 110, or a computing device 302 (FIG. 3) coupled to a node. Alternatively, the network may be configured by an inter-network configuration via a node 308, 309 or mobile computing device 302 (FIG. 3) located in another network that is in communication with the network 120. In another embodiment, an extra-network configuration can occur by relaying network configuration information to the network 120 from a node or device, such as a server, that is located outside of the network. For example, a server operating in a cloud may relay network configuration information based on the spatial configuration of one or more nodes, key nodes, key node groups, or key node colonies within the network 102.

Figure 4:
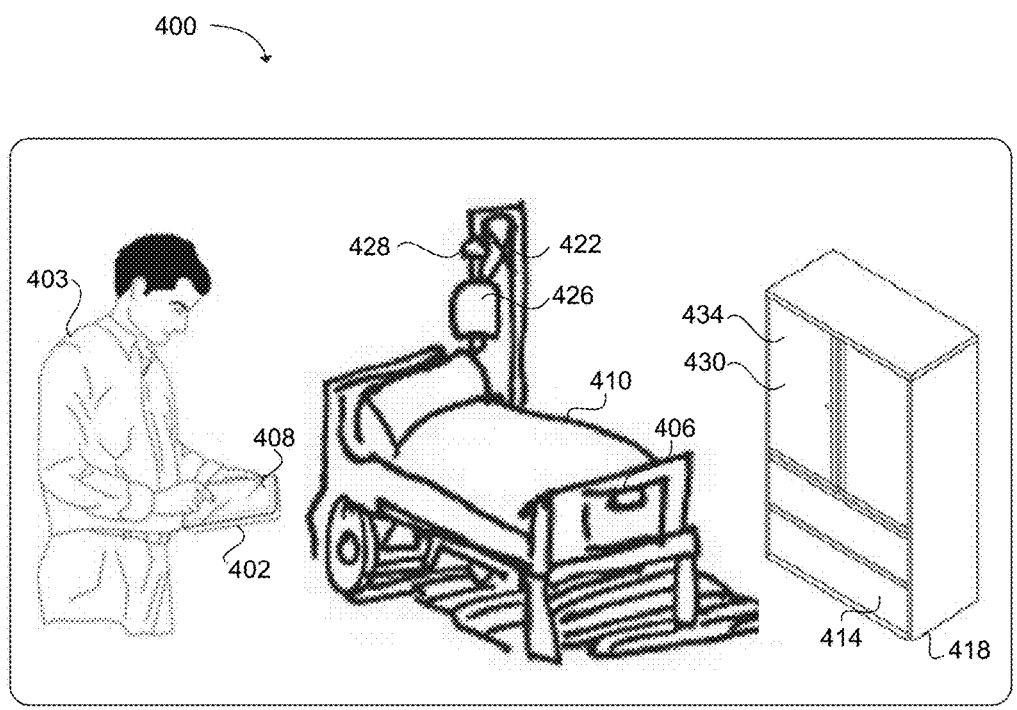
FIG. 4 illustrates a diagram of a spatially aware wireless network in a hospital setting in accordance with an example.

For example, as illustrated in FIG. 4, a doctor's tablet computing device 402 can include a spatially aware node 408, such as node 308 in FIG. 3. The spatially aware node 408 in the tablet computing device can be programmed and configured to operate as a key node in a spatially aware wireless network 400. When the doctor takes his tablet computing device into a patient room, the spatially aware node operating in the tablet 402 can communicate with other nodes within the room, such as a node 406 attached to a patient's bed 410, a node 414 attached to a drug delivery cabinet 418, a node 422 attached to an intravenous fluid (IV) dispenser 426, and node(s) 430 attached to other medical equipment 434.

The position of the tablet 402, such as a position near the patient's bed 410, can assign permissions, trigger actions, and or identify a network configuration for the spatially aware wireless network 400. For example, the network 400 can be configured to enable the medical equipment 434 to communicate stored data to the tablet 402. The network 400 can be configured to communicate a command to the drug delivery cabinet 418. Alternatively, the drug delivery cabinet can be assigned a permission to unlock. The network can be configured or the IV dispenser 426 can be assigned permissions that allow the delivery rate, or other variables of the IV dispenser 426, to be altered.

In one embodiment, the key node 408, operating in the tablet 402, can assign the permissions, send the triggers, or configure the network based on the relative position and orientation of the tablet relative to the position of the other nodes within the room. Alternatively, the assigned permissions, communicated triggers, or network configuration can be performed by other nodes within the spatially aware network 400, or by nodes or devices outside of the network. For example, a server operating in the hospital (not shown) can be in communication with the spatially aware network 400 and assign permissions based on the relative positions and orientations of the key node 408, a key node group comprising two or more nodes in the spatially aware network 400, or a key node colony, comprising all of the nodes in the spatially aware network 400.

In another embodiment, a key node group comprising a plurality of nodes within the spatially aware wireless network 400 may be designated as key nodes. The spatial configuration of the plurality of nodes in the spatially aware wireless network 400 can be used to configure the network to allow a certain task to be performed, such as the storing data in the network (i.e. patient information, medical device setting information, or medical device data), accessing data in the network (i.e. previous drug delivery information), collecting data (i.e. the patient's vital statistics), performing a decision (i.e. unlocking the storage cabinet 418), or triggering an action (i.e. increasing a flow of a narcotic from the IV dispenser 426. The orientation and position of the spatially aware node 408 coupled to the tablet 402 relative to the spatially aware node 422 coupled to the IV dispenser 426 and the spatially aware node 406 coupled to the bed 410 can be used to determine the network configuration. The relative position and orientation of the key node group can determine what network configurations, behavior, or permission will occur for one or more nodes or devices in the spatially aware wireless network.

In another example, a spatially aware wireless network 400 can enable permissions when a key node colony comprising all of the nodes in the network 400 are spatially arranged in a specified manner (either absolute in space (location) or relative to other nodes (position). This can be referred to as a "swarm", wherein the spatial position of the entire network is used to trigger an action or permission or a network configuration at one or more nodes in the network. It should be noted that the trigger or action or network configuration is often for a computing device or other type of electronic device that is associated with a selected node, such as the medical equipment in the previous example.

The network configuration, action, permission, or trigger event can be modified based on information collected (i.e. accessed from memory or data storage), or based on a trending spatial arrangement (past, current, or predicted). Accordingly, the same spatial arrangement may not always generate the same actions performed or permissions granted. Rather, the action performed or permission granted can be based on the trending spatial arrangement.

In one example, a spatial arrangement determination can initiate (i.e. permit) access to data stored within the network. Data access may be permitted for only one node, or for multiple nodes, or the mobile computing devices or electronic equipment connected to the node(s). Permissions may allow (notify) one or more nodes to access the specified data. Alternatively, a permission may transfer data access capability to the permitted node(s). In one example, the permission may be an encryption key, an address to a location of permitted data, or other type of permission. Without the permission, the node will not have access, or limited access to the data.

For example, the key node 408 operating in the doctor's tablet 402, may communicate an encryption key to the medical devices 434, granting them permission to communicate data to the key node 408, or directly to the doctor's tablet 402 or a network or server in communication with the doctor's tablet. Alternatively, another intra-network or inter-network node or device may communicate the encryption key based on the key node's 408 relative orientation and position to other nodes within the spatially aware network 400.

In another example, a node can enter a spatially aware wireless network with new capabilities or features that were not previously contained within the network. Access to this node or device's functionality can be permitted to selected nodes within the network. This can be referred to as an enable functionality. The enable functionality can change a previous algorithm for assigning permissions. For example, the spatially aware wireless network 400 may use a fingerprint scan of the doctor 403 in place of an alternate verification method once the fingerprint scanner functionality is accessible by the network.

For instance, the doctor's tablet 402 can include a biometric verification capability, such as facial detection, a fingerprint or iris scanner, or the like. The associated node's 408 data can be accessed by other nodes and the information collected (i.e. biometric verification information) can be used to assign permissions or setup network configurations. In one example, when the doctor's tablet 402 is positioned near the patient's bed (i.e. within a predetermined distance from the bed), and oriented towards the doctor 403, while the doctor's finger print is detected, then this information, or a permission based on the information, can be communicated to the drug delivery cabinet 418, allowing the doctor 403 to access selected drugs for the patient.

In another example, the doctor's tablet 402 can be identified as a key node that is configured to provide access to selected programs or data based on the relative position of the doctor's tablet 402. For example, the doctor's tablet can provide access to personal, private medical information only near the upper half of the patient's bed 410. This allows a doctor to approach the patient and have access to the patient's private information while the doctor is standing next to the patient, while providing security to the patient that his or her information will not be viewed in other locations.

In addition to providing permission based on location, additional actions can be taken as well. For example, an alarm may be activated if a device is moved out of a desired location. The computing device can be embedded in a broad array of medical equipment, including implantable medical devices. The ability to determine relative location, distance, and orientations can provide significant advantages.

The wireless communication of proximity based information enables a user to send or receive content from a radio transceiver when the user is within a limited proximity of a location or object. In one embodiment, the radio transceiver can be spatially aware of other radio transceivers. The content communicated by the spatially aware wireless transceiver can be related to or associated with the location or the object. The location or object can be associated with another spatially aware radio transceiver.

In one example, the sending or receiving of information can be triggered by a user entering a limited proximity to a location or an object associated with a spatially aware wireless transceiver. This may be done to increase the security of the communication link or the data being communicated by limiting the location or direction in which the data is transmitted or received. Knowing a location or orientation where certain data is permitted to be communicated allows security protocols to be implemented. For example, security protocols can be implemented such as shielding around a room, or limited communication access of people, equipment, or other communication nodes that should not have access to the data or may eavesdrop on the data communications. This may allow data to be communicated more efficiently or more securely by limiting the communication of data to a specific location or orientation.

Spatially Defined Security Permission

In another example, a spatially aware node 308 can be coupled to a mobile computing device such as a mobile phone or tablet computing device. Another spatially aware node can be embedded at a predetermined location in a vehicle. The mobile phone or tablet computing device can be configured to run an app when they are located within a vehicle. The app can instruct the embedded spatially aware node in the vehicle to communicate a spatial position signal to the spatially aware node operating in the mobile computing device, such as the phone, phone case, watch, or tablet. The relative position of the phone or tablet within the vehicle can be determined. If it is determined that the position of the mobile phone or tablet is at or near the driver's seat within the vehicle, the functionality of the mobile phone or tablet can be reduced so that the driver will not be distracted while operating the vehicle.

The ability to determine the relative position and orientation of spatially aware nodes within a vehicle can be useful in a number of ways. For example, programmable settings such as radio presets, seat and mirror position, and the like can be set based on the position of a user's cell phone (with an embedded spatially aware node) relative to the driver's seat. In addition, a spatially aware network can be configured to monitor, report, store, or access the vehicle's settings, such as speed, governor settings, vehicle monitoring settings, mileage logging, and/or remote tracking of the vehicle based on the position and orientation of one or more selected spatially aware nodes relative to other nodes in the network.

In another example, a mobile computing device 302 with a spatially aware node 308 can be embedded in selected military equipment or other secure communication systems. For example, a soldier may have a mobile computing device on an arm band. Another mobile computing device can be located within a portable weapon, such as an anti-aircraft missile launcher. The anti-aircraft missile launcher can be configured to operate only when the location of the launcher relative to the soldier is within desired tolerances.

Additional examples of spatially defined communications include applications in a medical body area network, applications with multiple nodes in specific locations and/or orientations, applications where a device is only permitted access to a network when its relative position and orientation are within an approximate predefined value, applications that prevent a wrong device from accessing a network based on its position, applications that prevent unauthorized devices from accessing the network based on their position, applications in which the ability to identify a position of a device adds an additional layer of security, and applications to validate a relative position inside a proximity. The spatially defined communication can be incorporated with proximity communications such that an object or device can communicate or operate a specific program or application based on being within a proximity boundary, and/or having a predetermined orientation within that boundary.

Figure 5A:
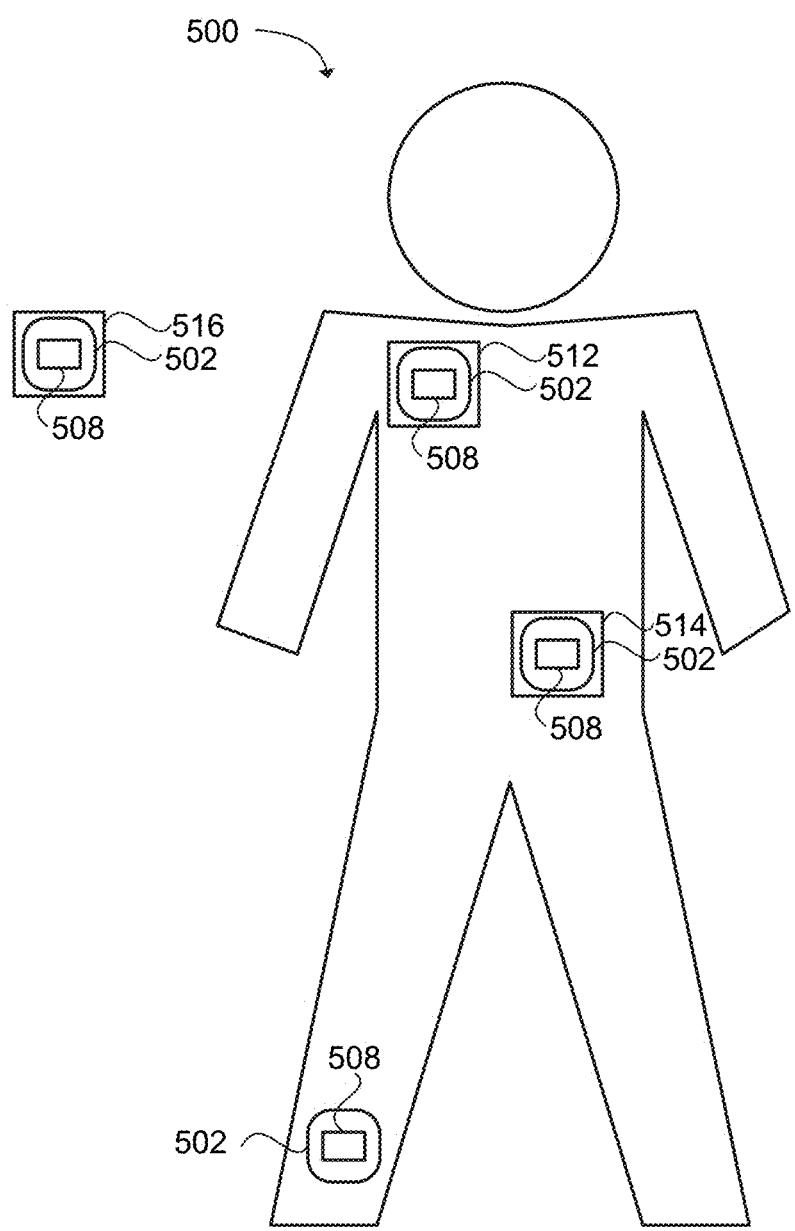
FIG. 5a illustrates a block diagram of a spatially aware wireless network used as a personal area network in accordance with an example.

FIG. 5a provides an example of a body area network or personal area network that is a spatially aware wireless network 500 comprising a plurality of computing devices 502. Each computing device includes a polarized near field magnetic induction node 508 configured to communicate a spatial configuration signal using near field magnetic induction (NFMI). In one embodiment, the spatial configuration signal can be communicated (transmitted or received) using at least two substantially orthogonal antennas. In one embodiment, three substantially orthogonal antennas can be used to transmit or receive the spatial configuration signal using NFMI. The spatial position signal can be used to determine one or more of a position and an orientation of one or more nodes in the spatially aware wireless network, as previously discussed. The computing device 502 can include a detection module configured to activate a trigger or configure a network using one or more of the plurality of nodes or via an intra-network communication. The trigger or network configuration can be activated based on at least one of the relative position and orientation of one or more nodes in the plurality of nodes.

As previously discussed, the trigger or network configuration can be determined based on a relative position and/or orientation of a selected node, referred to as a key node, the relative position and/or orientation of a plurality of nodes on the body area network, referred to as a key node group, or the relative position and/or orientation of each node in the body area network, referred to as a key node colony. The computing device 502 can also include a function module configured to receive the trigger or network configuration information and perform a predetermined function. The detection module and the function module can be integrated in a digital circuit in the computing device or the spatially aware NFMI node 508. Alternatively, the detection module and the function module can be software stored in a digital memory configured to operate in the computing device 502 or the spatially aware NFMI node 508.

In one embodiment, the function module can be further configured to: perform a decision based on one or more of the location, the position, and the orientations of the one or more nodes in the plurality of nodes; or trigger an action on one of an electronic device (e.g. a computing device) and a physical device (e.g. a machine or vehicle) based on one or more of the location, the position, and the orientations of the one or more nodes in the plurality of nodes; store data at one or more nodes in the plurality of nodes; access data at or more nodes in the plurality of nodes; collect data from one or more nodes in the plurality of nodes. In one embodiment, collecting data from one or more nodes can involve transmitting or receiving information from other nodes. Accessing data at one or more nodes can involve reading data that is stored in a memory device of a node. The trigger module can be configured to activate the trigger using one or more of the plurality of nodes. The trigger can be activated based on at least one of a relative position and a relative orientation of one or more nodes in the plurality of nodes to another node in the plurality of nodes using the spatial position signal.

The plurality of nodes can be configured to communicate the spatial position signal using one or more of a near field magnetic induction (NFMI) physical layer or a NFMI data link layer. The ability to communicate the spatial position signal using the NFMI physical layer or NFMI data link layer enables the information to be updated on a frequent basis. For example, the spatial position signal can be updated multiple times per second. In other systems, the spatial position information may not be needed to be updated as frequently, thereby reducing the amount of energy use at an NFMI node. However, the ability to update the information frequently enables the spatially aware wireless network to be useful in critical infrastructure, such as medical equipment, industrial equipment, and military equipment, secure communications, to name a few. By frequently updating the spatial position signal, a user or another node can know the relative position and/or orientation of a node in the network in substantially near real time. If an absolute (i.e. geographic) location of one or more nodes in the network is known, then that information can be used to determine the location of the other nodes in the network based on the relative position and orientation of each node relative to the known location.

While the spatially aware wireless network has been described with respect to a body area network, it is not intended to be limiting. The spatially aware wireless network can also be used in a personal area network (PAN) or other types of networks where a position and orientation of one or more nodes relative to other nodes can be useful.

Figure 5B:
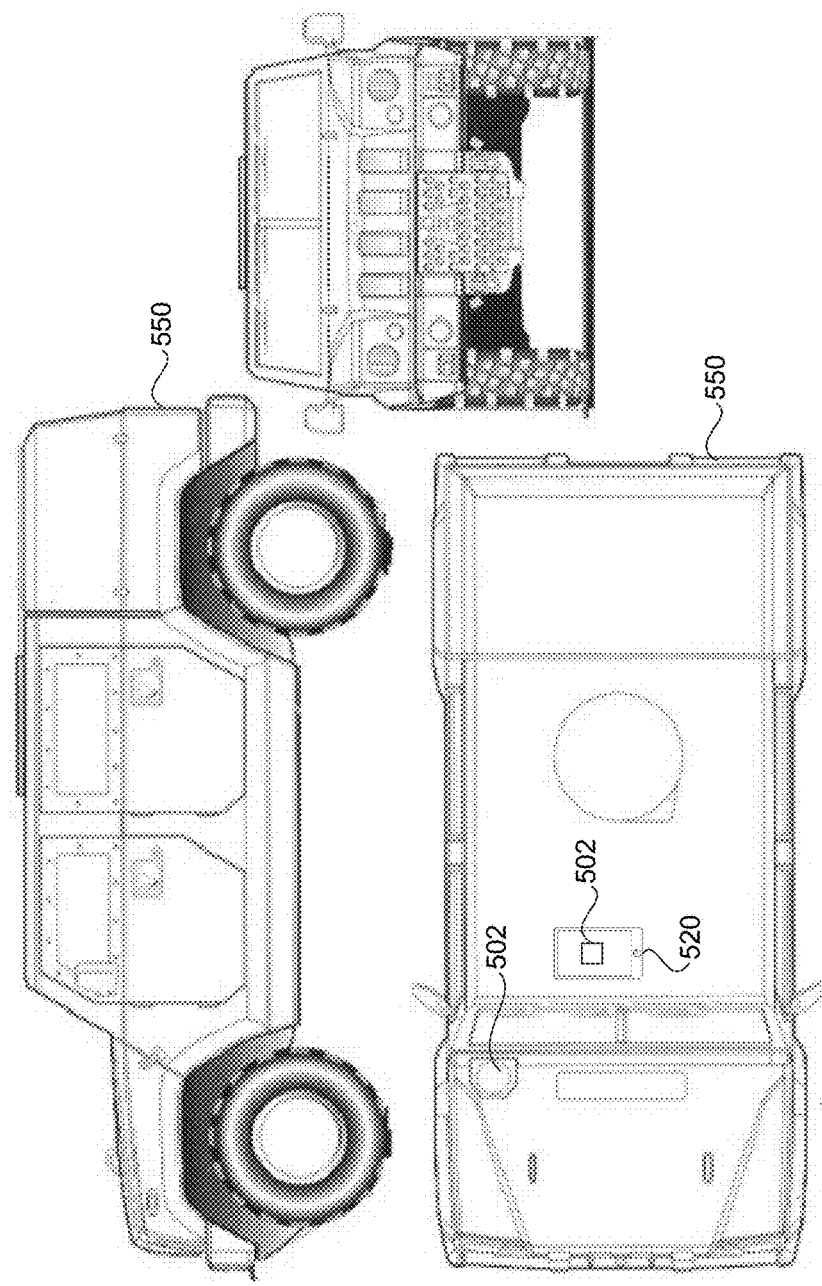
FIG. 5b illustrates a block diagram of a spatially aware wireless network used in a vehicle in accordance with an example.

In another example, illustrated in FIG. 5b, a spatially aware node 502 can be coupled to a mobile computing device 520 such as a mobile phone or tablet computing device. Another spatially aware node 502 can be embedded at a predetermined location in a vehicle 550. The mobile phone or tablet computing device 520 can be configured to run an app when the mobile phone or tablet computing device is located within the vehicle 550. The app can instruct the spatially aware node 502 in the vehicle 550 to communicate a spatial position signal to the node 502 in the mobile computing device, such as the phone or tablet 520. The relative position of the phone or tablet 520 within the vehicle 550 can be determined. If it is determined that the position of the mobile phone or tablet 520 is at or near the driver's seat within the vehicle 550, the functionality of the mobile phone or tablet can be reduced so that the driver will not be distracted by the mobile phone or tablet while operating the vehicle 550.

Figure 5C:
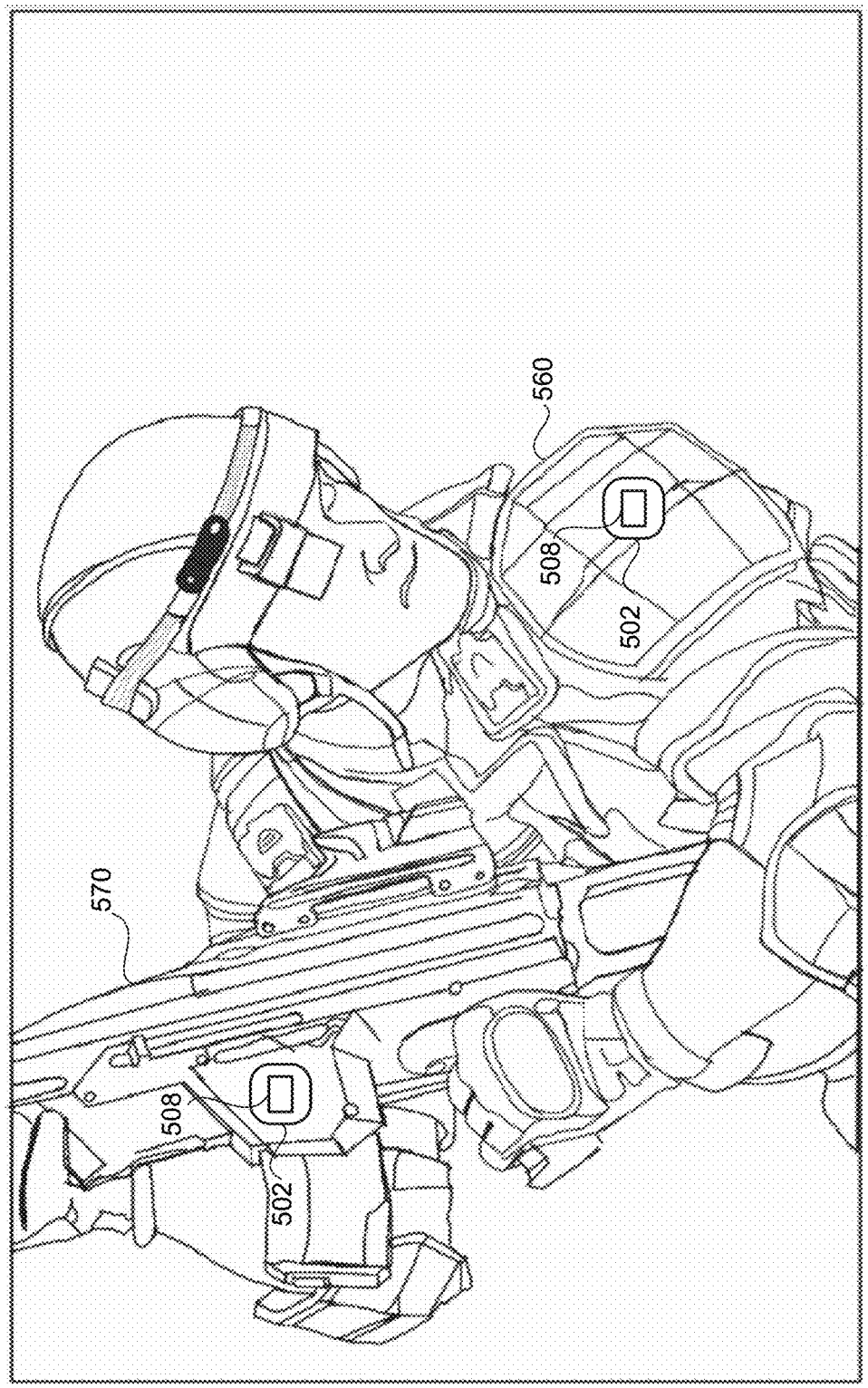
FIG. 5c illustrates a block diagram of a spatially aware wireless network used in a military setting in accordance with an example.

In another example, illustrated in FIG. 5c, a spatially aware node 508 can be embedded in selected military equipment. For example, a soldier 560 may have a mobile computing device 502 on an arm band with an embedded spatially aware node 508. Another mobile computing device 502 can be located within a portable weapon 570, such a machine gun or an anti-aircraft missile launcher (not shown). The portable weapon 570 can be configured to operate only when the location of the portable weapon 570 relative to the soldier 560 is within desired tolerances.

Figure 6:
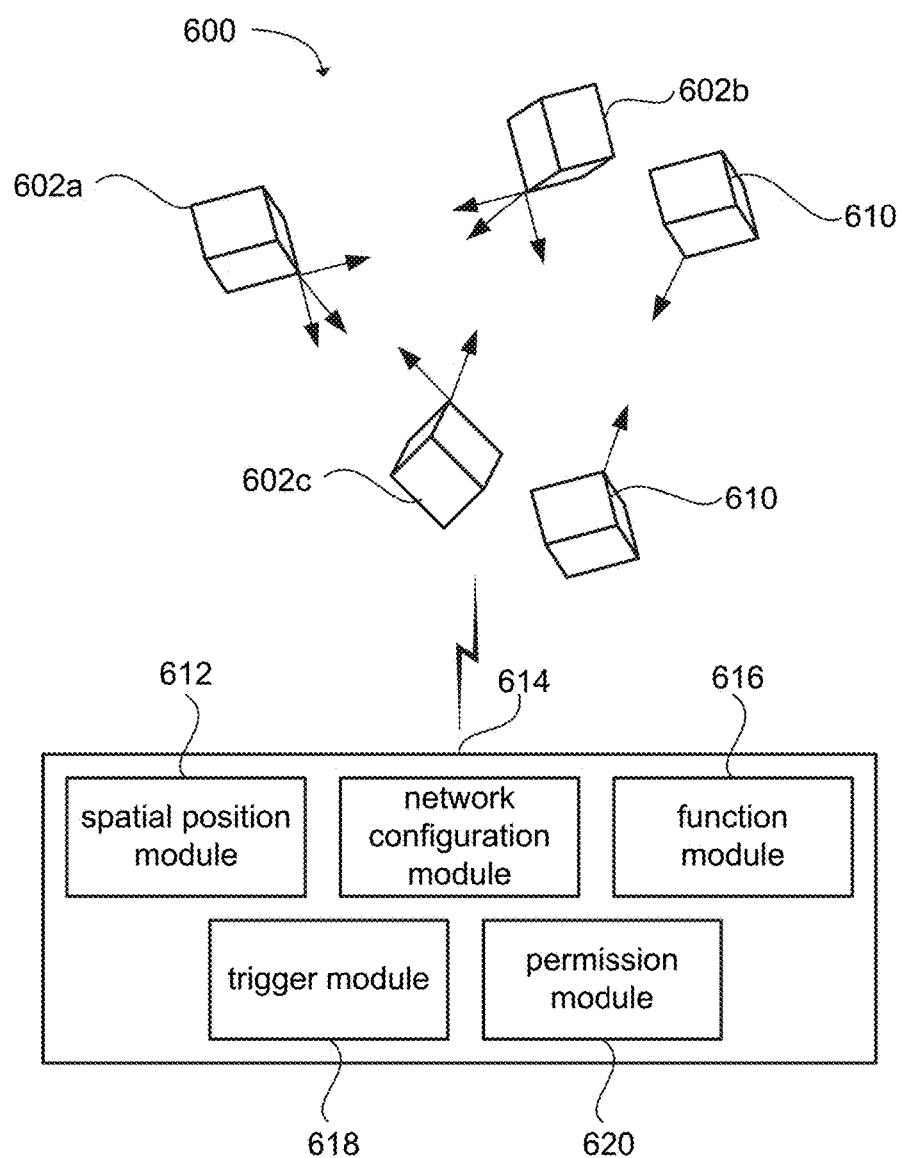
FIG. 6 illustrates a block diagram of a spatially aware wireless network in accordance with an example.

Another example of a spatially aware wireless network 600 is illustrated in FIG. 6. The spatially aware wireless network comprises a plurality of nodes 602a, 602b, 602c and 610. One or more nodes in the plurality of nodes is configured to receive, via a physical layer communication, a polarized spatial position signal from a transmitting node in the plurality of nodes. The polarized spatial position signal is a near field magnetic induction (NFMI) signal that is communicated using an NFMI RAT. The polarized spatial position signal may contain information or may have its phase, amplitude, or frequency altered in a way that makes it discernable from other signals.

The polarized spatial position signal may be transmitted by a node with two or more relatively orthogonal antennas, such as node 602a, 602b, or 602c and received by a node with a single antenna, such as node 610. The polarized spatial position signal may also be transmitted by a node with a single antenna, such as node 610, and received by a node with multiple antennas, such as node 602a, 602b, or 602c. The polarized spatial position signal may also be transmitted by a node with two or more relatively orthogonal antennas, such as node 602a, 602b, or 602c and received by a node with two or more relatively orthogonal antennas, such as node 602a, 602b, or 602c.

The spatially aware wireless network 600 can further comprise a spatial position module 612 configured to determine an orientation and a position of the transmitting node, such as node 602c, in the spatially aware wireless network 600. The orientation and the position of the transmitting node, relative to the receiving node, can be based on the amplitude of the received polarized spatial positioning signal.

The spatially aware wireless network 600 can further comprise a network configuration module 614 that is configured to define a network configuration using one or more of the plurality of nodes, wherein the network configuration is defined based on at least one of the position, and the orientation of the one or more nodes in the plurality of nodes identified using the spatial position module 612. The network configuration can be based on the relative position and/or orientation of a key node, a key node group, or a key node colony. Alternatively, the network configuration module 614 can act as a trigger or action module. The trigger or action module 618 can be configured to communicate a trigger or action based on at least one of the position, and the orientation of the one or more nodes in the plurality of nodes identified using the spatial position module 612. In an alternative embodiment, a permission module 620 can be configured to communicate a permission to selected nodes in the plurality of nodes or to an external device based on at least one of the position, and the orientation of the one or more nodes in the plurality of nodes identified using the spatial position module. The external device may be a server, an electrical device, a mechanical device, or another desired device configured to receive a permission based on the position and/or orientation of the one or more nodes in the plurality of nodes identified using the spatial position module.

In one embodiment, the network configuration module 614 can configure the network as one or more of: a data storage configuration to store data at one or more nodes in the plurality of nodes; a data access configuration to access stored data at one or more nodes in the plurality of nodes; and/or a data collection configuration to collect data from one or more nodes in the plurality of nodes. In one embodiment, accessing data involves accessing data that is previously stored. Collecting data involves retrieving data from a source, such as a medical monitor or other type of data source. A node can access information from an external device, such as a keyboard, a camera, a microphone, a server, an Ethernet connection, and so forth.

In one embodiment, the network configuration module 614 is configured to configure the spatially aware wireless network, using one or more of the plurality of nodes, wherein the network configuration is activated based on at least one of a relative position, and a relative orientation of one or more nodes in the plurality of nodes relative to another node in the plurality of nodes identified using the polarized spatial positioning signal The spatially aware wireless network 600 can further comprise a function module 616 that is configured to perform a selected function using the defined network configuration. The selected function can perform a decision based on one or more of: data from one or more of the plurality of nodes; one or more of the position and the orientation of the one or more nodes in the plurality of nodes. The selected function can also: communication information within the spatially aware wireless network; communicate information external to the spatially aware wireless network; communicate a control signal within the spatially aware wireless network; communicate a permission within the spatially aware wireless network, grant a permission within the spatially aware wireless network, trigger an action on one of an electric device and a physical device based on the performed decision, or based on one or more of the position and the orientation(s) of the one or more nodes in the plurality of nodes.

In one embodiment, each of the one or more nodes in the spatially aware wireless network 600 can include: the spatial positioning module; the spatial positioning module and the network configuration module; or the spatial positioning module, the network configuration module, and the function module. The modules can be embedded in the nodes, thereby enabling the nodes to make decisions, configure the network, send triggers, and so forth.

In another embodiment, a server that is in communication with the spatially aware wireless network can include: the spatial positioning module; the spatial positioning module and the network configuration module; or the spatial positioning module, the network configuration module, and the function module. Depending on the system requirements, the one or more nodes can be relatively simple, with most decisions being made by the server, or relatively complex, with most decisions made at the nodes.

In another embodiment, the spatial position module can determine a velocity of the one or more nodes based on a change of the determined position or a radial velocity of the one or more nodes based on a change of the determined orientation.

Additional examples of spatially defined communications include applications in a medical body area network, applications with multiple nodes in specific locations and/or orientations, applications where a device is only permitted access to a network when its position (i.e. relative position and orientation) are within an approximate predefined value, applications that prevent a wrong device from accessing a network based on its position, applications that prevent unauthorized devices from accessing the network based on their position, applications in which the ability to identify a position of a device adds an additional layer of security, and applications to validate a relative position inside a desired perimeter. The spatially defined communication can be incorporated with NFMI spatially aware nodes configured to communicate a polarized spatial position signal such that an object or device can communicate or operate a specific program or application based on being within a desired boundary, and/or having a predetermined relative position or orientation within that boundary.

Figure 7:
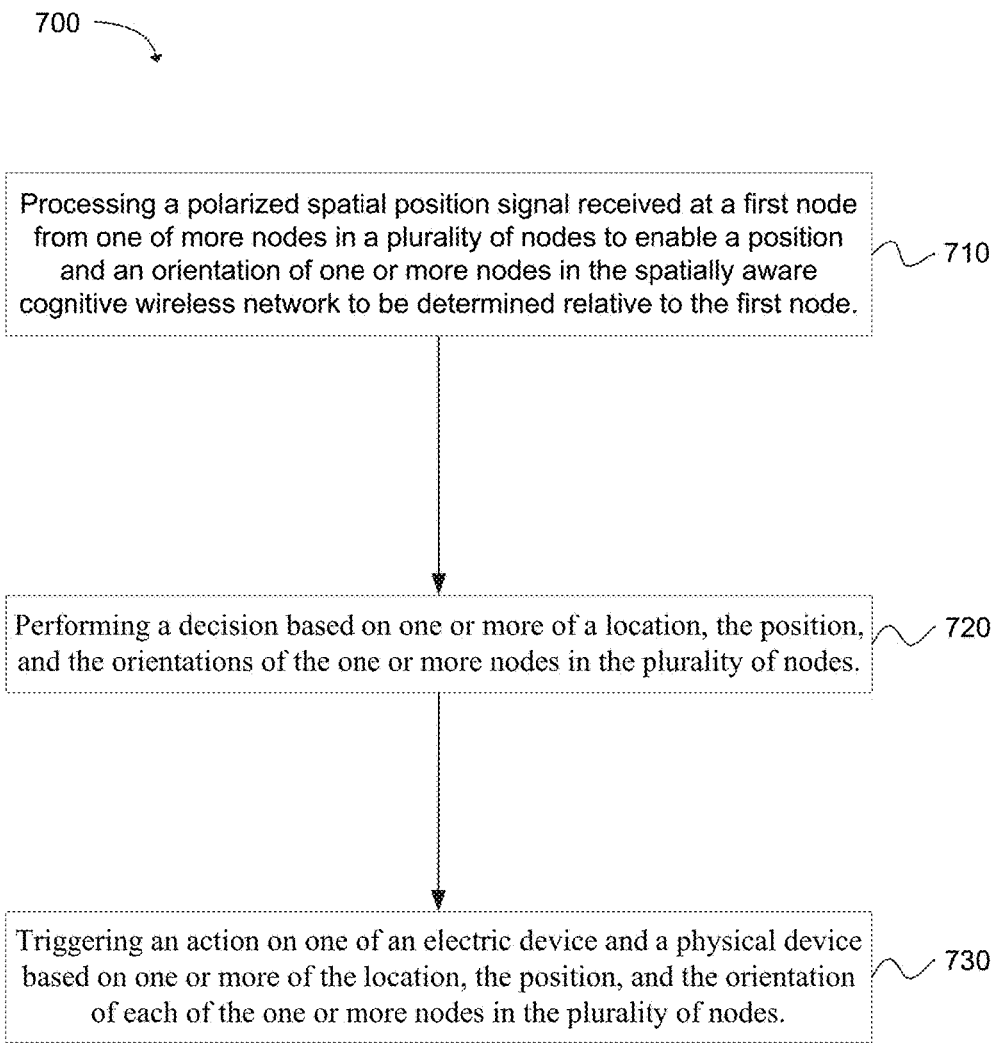
FIG. 7 illustrates a flow chart depicting functionality of a spatially aware wireless network in accordance with an example.
Figure 8:
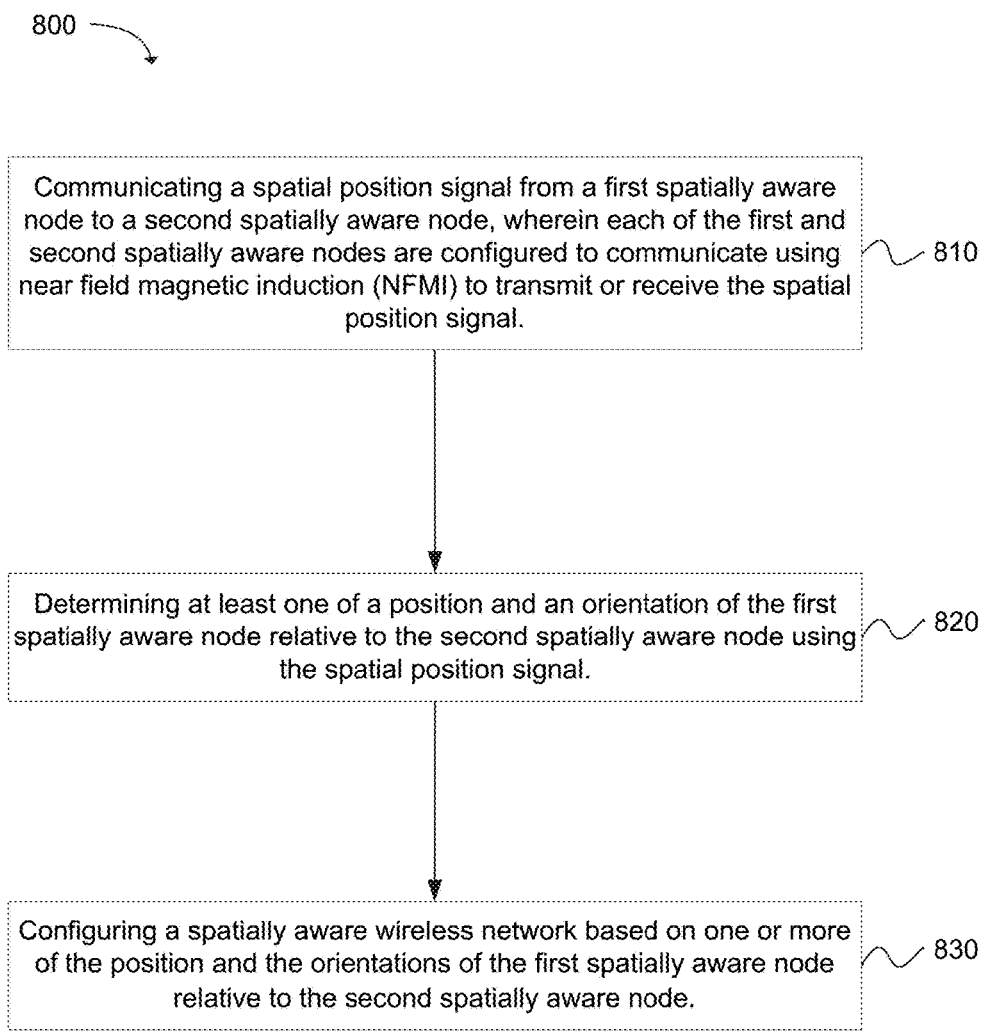
FIG. 8 depicts a flow chart of a method for forming a spatially defined communication network in accordance with an example.

Another example provides functionality 700 of a spatially aware wireless network, as shown in the flow chart of FIG. 7. The functionality can be implemented as a method or the functionality can be executed as instructions on a machine, where the instructions are included on one or more transitory computer readable mediums or one or more non-transitory machine readable storage mediums. A spatial positioning signal that is received at a first node from one or more nodes in a plurality of nodes using near field magnetic induction can be processed, as shown in block 710. The spatial position signal can be transmitted and/or received with three substantially orthogonal antennas by varying the signals between the three antennas to enable a position and an orientation of one or more nodes in the spatially aware wireless network to be determined relative to the first node. A decision can be performed based on one or more of the position and the orientations of the one or more nodes in the plurality of nodes, as shown in block 720. The spatially aware wireless network can be configured based on one or more of the position and the orientation of the one or more nodes in the plurality of nodes, as shown in block 730.

In another embodiment, the spatially aware wireless network can comprise a permission module configured to communicate a permission to selected nodes in the plurality of nodes or to an external device based on at least one of the position, and the orientation of the one or more nodes in the plurality of nodes identified using the spatial position module. The external device may be a server, an electrical device, a mechanical device, or another desired device configured to receive a permission based on the position and/or orientation of the one or more nodes in the plurality of nodes identified using the spatial position module.

The functionality can further comprise instructions, which, when executed by the one or more processors, cause the triggered action to: store data at one or more nodes in the plurality of nodes; access data at or more nodes in the plurality of nodes; or collect data from one or more nodes in the plurality of nodes. In addition, the triggered action can cause the spatial position signal to be communicated using one or more of a near field magnetic induction (NFMI) physical layer or a near field magnetic induction data link layer, as previously discussed. The spatially aware wireless network can be configured as one of a body area network and a personal area network.

One embodiment of the present invention provides a method 800 for spatially defined communication. The method comprises the operation of communicating a spatial position signal from a first spatially aware wireless node to a second spatially aware wireless node, as shown in block 810. Each of the first and second spatially aware wireless nodes can be configured to communicate using near field magnetic induction (NFMI). Each of the first and second spatially aware wireless nodes can include at least two substantially orthogonal antennas to transmit or receive the spatial position signal. In one embodiment, each spatially aware wireless node includes three substantially orthogonal antennas.

The method 800 further comprises determining at least one of a position and an orientation of the first spatially aware wireless node relative to the second spatially aware wireless node using the spatial position signal, as shown in block 820. A decision can be performed based on one or more of the position, and the orientations of the first spatially aware wireless node relative to the second spatially aware wireless node, as shown in block 830. In one embodiment, an action can be triggered on one of an electrical device and a physical device based on one or more of the position and the orientation of the first spatially aware wireless node relative to the second spatially aware wireless node, as shown in block.

The method 800 can further comprise communicating the spatial position signal from the first spatially aware wireless node to the second spatially aware wireless node. At least one of the first spatially aware wireless node and the second spatially aware wireless node can be configured to be coupled to a mobile computing device. A location of the first spatially aware wireless node can be identified to determine a location of the second spatially aware wireless node using the relative position of the second spatially aware wireless node to determine the position and orientation of the first spatially aware wireless node. In one embodiment, a plurality of spatially aware wireless nodes can be configured to communicate the spatial position signal to form a spatially aware wireless network.

The method 800 further comprises triggering a function at one of the first spatially aware wireless node and the second spatially aware wireless node based on a location, the position, and the orientation of one of the first spatially aware wireless node and the second spatially aware wireless node. The operation of triggering the function can include one or more of: storing data at one of the first spatially aware wireless node and the second spatially aware wireless node; accessing data at one of the first spatially aware wireless node and the second spatially aware wireless node; collecting data from a selected node in a network at one of the first spatially aware wireless node and the second spatially aware wireless node; performing a decision; and triggering an action on one of an electric device and a physical device.

In one embodiment, the spatial location signal can be communicated between the first spatially aware wireless node and the second spatially aware wireless node at a physical layer. The spatial location signal can be communicated between the first spatially aware wireless node and the second spatially aware wireless node at the physical layer in real time or near real time to enable the first spatially aware wireless node to know a relative position and a relative orientation of the second spatially aware wireless node in near real time. Alternatively, the spatial location signal can be communicated between the first spatially aware wireless node and the second spatially aware wireless node at a data link layer, or another higher layer.

It should be understood that many of the functional units described in this specification have been labeled as modules, in order to more particularly emphasize their implementation independence. For example, a module may be implemented as a hardware circuit comprising custom Very-Large-Scale Integration (VLSI) circuits or gate arrays, a custom Application-Specific Integrated Circuit (ASIC), off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A spatially aware wireless network comprising:
   a plurality of nodes, wherein one or more nodes in the plurality of nodes is configured to receive, via a physical layer, a polarized spatial position signal from a transmitting node in the plurality of nodes using near field magnetic induction (NFMI);
   a spatial position module configured to determine a relative spatial orientation and a position of the transmitting node in the spatially aware wireless network, based on the received polarized spatial positioning signal, to determine a position and a radial velocity of the transmitting node relative to the one or more nodes; and
   a network configuration module configured to define a network configuration using one or more of the plurality of nodes, wherein the network configuration is defined based on the position and the radial velocity of the one or more nodes in the plurality of nodes identified using the spatial position module.

2. The spatially aware wireless network of claim 1, further comprising a function module configured to perform a selected function using the defined network configuration.

3. The spatially aware wireless network of claim 1, wherein the one or more nodes in the plurality of nodes is configured to:
   receive the polarized spatial position signal, that is transmitted on a single antenna from the transmitting node, at two or more substantially orthogonal antennas of each of the one or more nodes; or
   receive the polarized spatial position signal, that is transmitted on two or more substantially orthogonal antennas from the transmitting node, at a single antenna on the one or more nodes; or
   receive the polarized spatial position signal, that is transmitted on two or more substantially orthogonal antennas from the transmitting node, at two or more substantially orthogonal antennas of each of the one or more nodes.

4. The spatially aware wireless network of claim 2, wherein each of the one or more nodes includes:
   the spatial positioning module;
   the spatial positioning module and the network configuration module; or
   the spatial positioning module, the network configuration module, and the function module.

5. The spatially aware wireless network of claim 2, further comprising a server in communication with the spatially aware wireless network that is configured to include:
   the spatial positioning module;
   the spatial positioning module and the network configuration module; or
   the spatial positioning module, the network configuration module, and the function module.

6. The spatially aware wireless network of claim 1, wherein each node in the one or more nodes is configured to receive the polarized spatial position signal using NFMI with at least two substantially orthogonal antennas.

7. The spatially aware wireless network of claim 1, wherein the spatial position module is further configured to determine a velocity of the one or more nodes based on a change of the determined position or a change of the radial velocity of the one or more nodes based on a change of the determined orientation.

8. The spatially aware wireless network of claim 1, wherein the network configuration module is configured to define a network configuration based on the change of the determined position or the change of the determined relative spatial orientation of the one or more nodes.

9. The spatially aware wireless network of claim 1, wherein the network configuration module is further configured to configure the network as one or more of:
   a data storage configuration to store data at one or more nodes in the plurality of nodes;
   a data access configuration to access stored data at one or more nodes in the plurality of nodes; or
   a data collection configuration to collect data from one or more nodes in the plurality of nodes.

10. The spatially aware wireless network of claim 2, wherein the function module is further configured to perform a decision based on:
    data from one or more of the plurality of nodes; or
    one or more of the position and the relative spatial orientation of the one or more nodes in the plurality of nodes; or
    trigger an action based on one or more of the position and the relative spatial orientation of the one or more nodes in the plurality of nodes, the action comprising:
    an action communicated to an electric device;
    an action communicated to a physical device;
    a communication of information within the spatially aware wireless network;
    a communication of information external to the spatially aware wireless network;
    a communication of a control signal within the spatially aware wireless network;
    a communication of a permission within the spatially aware wireless network; or
    a permission granted within the spatially aware wireless network.

11. The spatially aware wireless network of claim 1, wherein the network configuration module is configured to configure the network, using one or more of the plurality of nodes, wherein the network configuration is activated based on at least one of a relative position, and a relative spatial orientation of one or more nodes in the plurality of nodes relative to another node in the plurality of nodes identified using the polarized spatial positioning signal.

12. The spatially aware wireless network of claim 1, wherein the plurality of nodes are configured to communicate the polarized spatial position signal using one or more of a near field magnetic induction (NFMI) physical layer or a near field magnetic induction data layer.

13. The spatially aware wireless network of claim 1, wherein the one or more nodes of the plurality of nodes are further configured to communicate using one or more additional radio access technologies (RATs) comprising: a near field communication (NFC) RAT, a Bluetooth RAT, an Institute of Electronics and Electrical Engineers (IEEE) 802.11 RAT, and a third generation partnership project (3GPP) Long Term Evolution (LTE) Release 8, 9, 10, 11 or 12 RAT.

14. The spatially aware wireless network of claim 1, wherein plurality of nodes are configured to form a body area network.

15. The spatially aware wireless network of claim 1, wherein plurality of nodes are configured to form a personal area network.

16. The spatially aware wireless network of claim 1, wherein the plurality of nodes are configured to form a cognitive network or a context aware network.

17. The spatially aware wireless network of claim 1, wherein the spatially aware wireless network is one of a personal area network and a body area network.

18. A method for forming a spatially defined communication network, comprising
    communicating a spatial position signal from a first spatially aware node to a second spatially aware node, wherein each of the first and second spatially aware nodes are configured to communicate using near field magnetic induction (NFMI) to transmit or receive the spatial position signal;
    determining a position and a radial velocity of the first spatially aware node relative to the second spatially aware node using the spatial position signal; and
    configuring a spatially aware wireless network based on one or more of the position and the radial velocity of the first spatially aware node relative to the second spatially aware node.

19. The method of claim 18, wherein each of the first and second spatially aware nodes include at least two substantially orthogonal antennas to communicate the spatial position signal.

20. The method of claim 18, further comprising communicating the spatial position signal from the first spatially aware node to the second spatially aware node, wherein at least one of the first spatially aware node and the second spatially aware node are configured to be coupled to a mobile computing device.

21. The method of claim 18, further comprising identifying a location of the first spatially aware node to determine a location of the second spatially aware node using the position of the second spatially aware node relative to the first spatially aware node.

22. The method of claim 21, further comprising triggering a function at one of the first spatially aware node and the second spatially aware node based on the location, the position, and the relative spatial orientation of one of the first spatially aware node and the second spatially aware node.

23. The method of claim 22, wherein triggering the function includes one or more of:
    storing data at one of the first spatially aware node and the second spatially aware node;
    accessing data at one of the first spatially aware node and the second spatially aware node;
    collecting data from a selected node in a network at one of the first spatially aware node and the second spatially aware node;
    performing a decision; and
    triggering an action on one of an electric device and a physical device.

24. The method of claim 18, wherein the spatial location signal is communicated between the first spatially aware node and the second spatially aware node at a physical layer.

25. The method of claim 18, wherein the spatial location signal is communicated between the first spatially aware node and the second spatially aware node at a physical layer in near real time to enable the first spatially aware node to know a relative position and a relative spatial orientation of the second spatially aware node in near real time.

26. The method of claim 18, wherein the spatial location signal is communicated between the first spatially aware node and the second spatially aware node at a data link layer.

27. The method of claim 18, further comprising a plurality of spatially aware nodes configured to communicate the spatial position signal to form a spatially aware cognitive wireless network.

28. A spatially aware wireless node:
- a wireless node configured to receive, via a physical layer, a polarized spatial position signal from a transmitting node in the spatially aware wireless node, using near field magnetic induction (NFMI);
- a spatial position module configured to determine an orientation and a position of the transmitting node in the spatially aware wireless network, based on the received polarized spatial positioning signal, to determine a position and a radial velocity of the transmitting node relative to the wireless node; and
- a network configuration module configured to define a network configuration based on the position and the radial velocity of the wireless node identified using the spatial position module.

29. The spatially aware wireless node of claim 28, further comprising a function module configured perform a selected function using the defined network configuration.

\* \* \* \* \*